United States Patent
Liu et al.

(10) Patent No.: US 12,283,037 B2
(45) Date of Patent: Apr. 22, 2025

(54) DETECTION METHOD FOR BATTERY SWAP IN BATTERY SWAP STATION

(71) Applicant: NIO TECHNOLOGY (ANHUI) CO., LTD, Hefei (CN)

(72) Inventors: Tao Liu, Hefei (CN); Shenyi Ding, Hefei (CN); Junhai Yang, Hefei (CN); Jiyong Zou, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 486 days.

(21) Appl. No.: 17/668,598

(22) Filed: Feb. 10, 2022

(65) Prior Publication Data
US 2022/0335593 A1    Oct. 20, 2022

(30) Foreign Application Priority Data
Apr. 14, 2021    (CN) .......................... 202110402607.2

(51) Int. Cl.
G06T 7/00    (2017.01)
G01B 11/22    (2006.01)
(Continued)

(52) U.S. Cl.
CPC ............ *G06T 7/0004* (2013.01); *G01B 11/22* (2013.01); *G06T 1/0007* (2013.01); *G06T 5/20* (2013.01);
(Continued)

(58) Field of Classification Search
CPC ........... G06T 7/00; G06T 7/0004; G06T 1/00; G06T 1/0007; G06T 5/20; G06T 5/50;
(Continued)

(56) References Cited

U.S. PATENT DOCUMENTS 9,378,541 B2 * 6/2016 Kim .......................... G06T 5/77
11,721,988 B2 * 8/2023 Cook ..................... B60L 3/0046
                                                    320/104
(Continued)

FOREIGN PATENT DOCUMENTS

CN    110441316 A  * 11/2019 ......... G01N 21/8806
CN    112024423 A  * 12/2020
(Continued)

*Primary Examiner* — Edward F Urban
*Assistant Examiner* — Benedict E Lee
(74) *Attorney, Agent, or Firm* — Sheridan Ross P.C.

(57) ABSTRACT

The invention relates to the field of battery swap technologies, and specifically provides a detection method for battery swap in a battery swap station. The invention aims to solve the following problem: Potential safety risks are caused by no prevention of a foreign matter on an upper surface of a battery, a damage on a battery in a process of battery swap, and no prevention of circulation of a battery with a damaged lower surface in a battery swap station, because a battery surface is not monitored before and after battery mounting in existing battery swap stations. To this end, the detection method for battery swap in the invention includes the following steps: obtaining a first image of a used battery at a first preset position; determining, based on the first image, whether the used battery is in a first anomalous state; selectively uploading the first image to a server based on a determination result; obtaining a second image of the used battery at a second preset position; determining, based on the second image, whether the used battery is in a second anomalous state; and selectively uploading the second image to the server based on a determination result, so that the server receives and stores the first image and the second image.

13 Claims, 8 Drawing Sheets

(51) Int. Cl.
  G06T 1/00     (2006.01)
  G06T 5/20     (2006.01)
  G06T 5/50     (2006.01)
  G06T 7/11     (2017.01)
  G06T 7/50     (2017.01)
  H04N 23/695   (2023.01)
  H04N 23/80    (2023.01)

(52) U.S. Cl.
  CPC .............. G06T 5/50 (2013.01); G06T 7/11 (2017.01); G06T 7/50 (2017.01); H04N 23/695 (2023.01); H04N 23/80 (2023.01); *G06T 2207/20021* (2013.01); *G06T 2207/20221* (2013.01); *G06T 2207/30108* (2013.01)

(58) Field of Classification Search
  CPC ... G06T 7/11; G06T 7/50; G06T 2207/20021; G06T 2207/20221; G06T 2207/30108; G06T 2207/30164; G01B 11/22; G01B 11/25; H04N 23/695; H04N 23/80; G01N 21/88; G01N 21/89; G01N 21/90; G01N 21/91; G01N 21/8851; G01N 21/94; G01N 21/95; G01N 2021/8854; G01N 2021/8887; G06V 10/26; G06V 20/52; G06V 20/64; H01M 2220/20; H01M 10/42; H01M 50/249; B60L 3/0046; B60L 53/305; B60L 53/80; B60L 58/10; B60L 53/68

See application file for complete search history.

(56) References Cited

U.S. PATENT DOCUMENTS

2022/0044023 A1* 2/2022 Xue .................. G06V 20/64
  2022/0260641 A1* 8/2022 Yoon .................. B60L 3/0046
  2022/0415056 A1* 12/2022 Ota .................... G06T 7/593

FOREIGN PATENT DOCUMENTS

CN       212179809 U  * 12/2020 ............ B25J 9/1697
  CN       212921203 U  *  4/2021 ............ B25J 9/1697

* cited by examiner

DETECTION METHOD FOR BATTERY SWAP IN BATTERY SWAP STATION

CROSS-REFERENCE TO RELATED APPLICATION

This application claims the benefit of China Patent Application No. 202110402607.2 filed Apr. 14, 2021, the entire contents of which are incorporated herein by reference in its entirety.

TECHNICAL FIELD

The invention relates to the field of battery swap technologies, and specifically provides a detection method for battery swap in a battery swap station.

BACKGROUND ART

With the popularization of new energy vehicles, how to effectively provide rapid and effective energy replenishment for vehicles with insufficient energy has become a very concerned problem for vehicle owners and major manufacturers. Taking electric vehicles as an example, in many manners of energy replenishment, battery swap has been a main development trend of electric energy replenishment because it can complete swap of a traction battery in a very short time and does not significantly affect the service life of the traction battery. Battery swap is usually carried out in a battery swap station, where a user drives a new energy vehicle in a drained state to a battery swap station, and a battery swap robot automatically detaches the used battery and mounts a fully-charged service battery.

However, a lower surface of a battery may be scratched, bumped, collided with the ground, or have other damages when an electric vehicle moves, and an upper surface of the battery may have a foreign matter in a process of mounting. When the battery is mounted onto the electric vehicle, the foreign matter may further damage the battery itself. However, at present, the foregoing cases are not determined or recorded in a process of battery swap, and consequently, when a battery fault occurs, reasons and responsibilities for the battery fault, and a standard for handling the faulty battery cannot be determined, further affecting user experience.

Therefore, to solve the foregoing problem, a new detection method for battery swap in a battery swap station is needed in the art.

SUMMARY OF THE INVENTION

To solve the foregoing problem in the prior art, that is, to solve the following problem: Potential safety risks are caused by no prevention of a foreign matter on an upper surface of a battery, a damage on a battery in a process of battery swap, and no prevention of circulation of a battery with a damaged lower surface in a battery swap station, because a battery surface is not monitored before and after battery mounting in existing battery swap stations, the invention provides a detection method for battery swap in a battery swap station, where the battery swap station includes a battery swap platform and a battery compartment. The detection method for battery swap includes the following steps: obtaining a first image of a used battery at a first preset position; determining, based on the first image, whether the used battery is in a first anomalous state; selectively uploading the first image to a server based on a determination result, so that the server receives and stores the first image; obtaining a second image of the used battery at a second preset position; determining, based on the second image, whether the used battery is in a second anomalous state; and selectively uploading the second image to the server based on a determination result, so that the server receives and stores the second image, where the first preset position is in the battery swap platform; and the second preset position is in the battery compartment.

In a preferred technical solution of the detection method for battery swap, the step of determining, based on the first image, whether the used battery is in a first anomalous state specifically includes: pre-processing the first image to obtain a target image; and determining, based on the target image, whether the used battery is in the first anomalous state.

In a preferred technical solution of the detection method for battery swap, the first image is a three-dimensional image; and the step of pre-processing the first image to obtain a target image specifically includes: calculating all pieces of gradient information of the first image in a Z-axis direction; determining whether each piece of gradient information is greater than preset gradient information; if the gradient information is greater than the preset gradient information, reserving an image part corresponding to the gradient information, to obtain the target image; and/or if the gradient information is less than or equal to the preset gradient information, filtering out an image part corresponding to the gradient information.

In a preferred technical solution of the detection method for battery swap, the step of determining, based on the target image, whether the used battery is in the first anomalous state specifically includes: calculating a difference value of the target image in the Z-axis direction; determining a scratch depth of the used battery based on the difference value; determining whether the scratch depth is greater than a preset scratch depth; if the scratch depth is greater than the preset scratch depth, determining that the used battery is in the first anomalous state; and/or if the scratch depth is less than or equal to the preset scratch depth, determining that the used battery is not in the first anomalous state.

In a preferred technical solution of the detection method for battery swap, the step of selectively uploading the first image to a server based on a determination result specifically includes: if the used battery is in the first anomalous state, uploading the first image to the server; and/or if the used battery is not in the first anomalous state, skipping uploading the first image to the server.

In a preferred technical solution of the detection method for battery swap, the battery swap station further includes a first image acquisition module mounted in the battery swap platform, where the first image acquisition module is configured to acquire the first image; and the step of obtaining a first image of a used battery at a first preset position specifically includes: obtaining the first image by using the first image acquisition module after a vehicle with a battery to be swapped arrives at the battery swap platform, where the used battery is mounted at the bottom of the vehicle with a battery to be swapped; and the first image is an image of a lower surface of the used battery.

In a preferred technical solution of the detection method for battery swap, the step of obtaining the first image by using the first image acquisition module specifically includes: obtaining a distance between the first image acquisition module and the used battery; determining, based on the distance, whether a field of view area of the first image acquisition module is greater than or equal to a lower surface area of the used battery; and selectively controlling, based on a determination result, the first image acquisition module to directly obtain the first image.

In a preferred technical solution of the detection method for battery swap, the battery swap station further includes a guide rail mechanism, and the first image acquisition module is mounted on the guide rail mechanism; and the step of selectively controlling, based on a determination result, the first image acquisition module to directly obtain the first image specifically includes: if the field of view area is greater than or equal to the lower surface area, controlling the first image acquisition module to directly obtain the first image; and/or if the field of view area is less than the lower surface area, controlling the guide rail mechanism to drive the first image acquisition module to move, controlling the first image acquisition module to capture a plurality of lower surface images of the used battery in a movement process, blending the plurality of lower surface images into a complete image, and using the complete image obtained through blending as the first image.

In a preferred technical solution of the detection method for battery swap, the step of determining, based on the second image, whether the used battery is in a second anomalous state specifically includes: invoking a first preset model for analyzing the second image; determining, based on an analysis result, whether there is a foreign matter on a surface of the used battery; and if there is a foreign matter on the surface of the used battery, determining that the used battery is in the second anomalous state; or if there is no foreign matter on the surface of the used battery, determining that the used battery is not in the second anomalous state.

In a preferred technical solution of the detection method for battery swap, the step of selectively uploading the second image to the server based on a determination result specifically includes: if the used battery is in the second anomalous state, uploading the second image to the server, and sending prompt information "Remove the foreign matter"; and/or if the used battery is not in the second anomalous state, skipping uploading the second image to the server.

In a preferred technical solution of the detection method for battery swap, the step of invoking the first preset model for analyzing the second image specifically includes: determining whether first pixels of the second image are greater than first preset pixels; and if the first pixels are greater than the first preset pixels, dividing the second image into a plurality of first sub-images according to a first preset method, obtaining a position of each of the first sub-images in the surface image, and analyzing each of the first sub-images; and/or if the first pixels are less than or equal to the first preset pixels, directly analyzing the second image.

In a preferred technical solution of the detection method for battery swap, the detection method for battery swap further includes: obtaining a surface image of a service battery at a third preset position before battery swap of a vehicle with a battery to be swapped; determining, based on the surface image, whether the service battery is in an anomalous state; and selectively uploading the surface image to the server based on a determination result, so that the server receives and stores the surface image, where the third preset position is in the battery compartment.

In a preferred technical solution of the detection method for battery swap, the step of determining, based on the surface image, whether the service battery is in an anomalous state specifically includes: invoking a second preset model for analyzing the surface image; determining, based on an analysis result, whether there is a foreign matter on a surface of the service battery; and if there is a foreign matter on the surface of the service battery, determining that the service battery is in the anomalous state; or if there is no foreign matter on the surface of the service battery, determining that the service battery is not in the anomalous state.

In a preferred technical solution of the detection method for battery swap, the step of selectively uploading the surface image to the server based on a determination result specifically includes: if the service battery is in the anomalous state, uploading the surface image to the server, and sending prompt information "Remove the foreign matter"; and/or if the service battery is not in the anomalous state, skipping uploading the surface image to the server.

In a preferred technical solution of the detection method for battery swap, the step of invoking a second preset model for analyzing the surface image specifically includes: determining whether second pixels of the surface image are greater than second preset pixels; and if the second pixels are greater than the second preset pixels, dividing the surface image into a plurality of second sub-images according to a second preset method, obtaining a position of each of the second sub-images in the surface image, and analyzing each of the second sub-images; and/or if the second pixels are less than or equal to the second preset pixels, directly analyzing the surface image.

In a preferred technical solution of the detection method for battery swap, the battery swap station further includes a conveying mechanism and a second image acquisition module, where the conveying mechanism is configured to convey the used battery and the service battery, and the second image acquisition module is configured to acquire the surface image and the second image; the step of obtaining a second image of the used battery at a second preset position specifically includes: obtaining the second image by using the second image acquisition module when the used battery is detached and conveyed to the second preset position, where the second image is an image of an upper surface of the used battery; and the step of obtaining a surface image of a service battery at a third preset position specifically includes: obtaining the surface image by using the second image acquisition module when the service battery is conveyed from the battery compartment to the third preset position, where the surface image is an image of an upper surface of the service battery.

In a preferred technical solution of the detection method for battery swap in the invention, the first image of the used battery is obtained at the first preset position; whether the used battery is in the first anomalous state is determined based on the first image; the first image is selectively uploaded to the server based on the determination result, so that the server receives and stores the first image; the second image of the used battery is obtained at the second preset position; whether the used battery is in the second anomalous state is determined based on the second image; and the second image is selectively uploaded to the server based on the determination result, so that the server receives and stores the second image.

Compared with a prior-art technical solution in which a battery swap station performs no determination or recording on detection before and after battery mounting, in the invention, the first image of the used battery is obtained at the first preset position, the second image of the used battery is obtained at the second preset position, whether the used battery is in the first anomalous state is determined based on the first image, and whether the used battery is in the second anomalous state is determined based on the second image. Detection is performed on the used battery at the two positions, such that detection of the used battery is more comprehensive, and whether the used battery is in an anomalous state is determined twice, such that whether the used battery is anomalous can be accurately determined. This can provide grounds for reasons and responsibilities of a battery fault when there is the battery fault. Further, the first image and/or the second image are/is selectively uploaded to the server based on the determination results, so that the server receives and stores the uploaded first image and/or second image. In this way, when there is a battery fault, a stored image of a faulty battery can be obtained from the server, and reasons and responsibilities of the battery fault are accurately determined based on the stored image, thereby avoiding ambiguous division of responsibilities, and ensuring accurate determination of a standard of handling the faulty battery. This provides a proper solution for handing a faulty battery, determines a standard of handling a faulty battery, and further improves user experience.

In addition, in the foregoing process, when the battery swap station determines whether the used battery is in the first anomalous state and whether the used battery is in the second anomalous state, a control manner of uploading the first image and/or the second image to the server only when the used battery is in the first anomalous state and/or the used battery is in the second anomalous state is more timely and stable compared with a technical solution in which determination is performed in the server. Moreover, the battery swap station uploads a first image and a second image of only an anomalous used battery to the server, instead of uploading first images and second images of all used batteries to the server. Therefore, the number of images stored in the server is reduced, so that when there is a battery fault, a stored image of a faulty battery can be quickly found, and traffic can also be reduced at the battery swap station, thereby causing no direct impact on a speed of finding the image, and further improving user experience.

Still further, the first image is an image of the lower surface of the used battery, and the second image is an image of the upper surface of the used battery, in other words, detection is performed at both the lower surface and upper surface of the used battery. In addition, whether the lower surface and the upper surface of the used battery are in an anomalous state is determined, such that detection on the used battery is more comprehensive, and images stored in the server are improved, thereby improving user experience.

Further, the first image is pre-processed to obtain the target image; and whether the used battery is in the first anomalous state is determined based on the target image, where compared with a prior-art technical solution in which a scratch depth is detected manually, this can automatically, quickly, and accurately detect a scratch depth of the used battery, thereby improving detection precision and stability.

Still further, the first image is a three-dimensional image, and the first image acquisition module is used to obtain the first image of the used battery, such that a cycle of battery swap is hardly affected, and user experience is fully considered.

Further, the first preset model is invoked for analyzing the second image, where compared with a method based on image processing in the prior art, this does not require storing model information of a large number of battery images, and because the first preset model is obtained by training based on a large number of battery images, and photographing conditions of different battery images are different from each other, the first preset model can effectively screen interference of light, photographing angles, and other photographing conditions, and can accurately analyze a surface image, thereby making an analysis result more accurate and stable.

Further, before battery swap of an electric vehicle with a battery to be swapped, the surface image of the service battery is obtained at the third preset position, and whether the service battery is in the anomalous state is determined based on the surface image. Detection is performed not only on the used battery but also on the service battery, and whether the service battery is in the anomalous state is also determined, such that whether the service battery is anomalous can be accurately determined. This can provide more grounds for reasons and responsibilities of a battery fault when there is the battery fault. Further, the surface image is selectively uploaded to the server based on the determination result, so that the server receives and stores the uploaded surface image. In this way, when there is a battery fault, reasons and responsibilities of the battery fault are more accurately determined, thereby further avoiding ambiguous division of responsibilities, and ensuring more precise determination of a standard of handling the battery. This provides a more proper solution for handing a battery, determines a standard of handling the battery, and further improves user experience.

Solution 1. A detection method for battery swap in a battery swap station, where the battery swap station includes a battery swap platform and a battery compartment; and the detection method for battery swap includes the following steps:

obtaining a first image of a used battery at a first preset position;

determining, based on the first image, whether the used battery is in a first anomalous state;

selectively uploading the first image to a server based on a determination result, so that the server receives and stores the first image;

obtaining a second image of the used battery at a second preset position;

determining, based on the second image, whether the used battery is in a second anomalous state; and selectively uploading the second image to the server based on a determination result, so that the server receives and stores the second image, where the first preset position is in the battery swap platform; and the second preset position is in the battery compartment.

Solution 2. The detection method for battery swap according to solution 1, where the step of determining, based on the first image, whether the used battery is in a first anomalous state specifically includes:

pre-processing the first image to obtain a target image; and determining, based on the target image, whether the used battery is in the first anomalous state.

Solution 3. The detection method for battery swap according to solution 2, where the first image is a three-dimensional image; and the step of pre-processing the first image to obtain a target image specifically includes:

calculating all pieces of gradient information of the first image in a Z-axis direction;

determining whether each piece of gradient information is greater than preset gradient information;

if the gradient information is greater than the preset gradient information, reserving an image part corresponding to the gradient information, to obtain the target image; and/or if the gradient information is less than or equal to the preset gradient information, filtering out an image part corresponding to the gradient information.

Solution 4. The detection method for battery swap according to solution 3, where the step of determining, based on the target image, whether the used battery is in the first anomalous state specifically includes:
calculating a difference value of the target image in the Z-axis direction;
determining a scratch depth of the used battery based on the difference value;
determining whether the scratch depth is greater than a preset scratch depth;
if the scratch depth is greater than the preset scratch depth, determining that the used battery is in the first anomalous state; and/or
if the scratch depth is less than or equal to the preset scratch depth, determining that the used battery is not in the first anomalous state.

Solution 5. The detection method for battery swap according to solution 4, where the step of selectively uploading the first image to a server based on a determination result specifically includes:
if the used battery is in the first anomalous state, uploading the first image to the server; and/or
if the used battery is not in the first anomalous state, skipping uploading the first image to the server.

Solution 6. The detection method for battery swap according to any one of solutions 1 to 5, where the battery swap station further includes a first image acquisition module mounted in the battery swap platform, where the first image acquisition module is configured to acquire the first image; and
the step of obtaining a first image of a used battery at a first preset position specifically includes:
obtaining the first image by using the first image acquisition module after a vehicle with a battery to be swapped arrives at the battery swap platform,
where the used battery is mounted at the bottom of the vehicle with a battery to be swapped; and the first image is an image of a lower surface of the used battery.

Solution 7. The detection method for battery swap according to solution 6, where the step of obtaining the first image by using the first image acquisition module specifically includes:
obtaining a distance between the first image acquisition module and the used battery;
determining, based on the distance, whether a field of view area of the first image acquisition module is greater than or equal to a lower surface area of the used battery; and
selectively controlling, based on a determination result, the first image acquisition module to directly obtain the first image.

Solution 8. The detection method for battery swap according to solution 7, where the battery swap station further includes a guide rail mechanism, and the first image acquisition module is mounted on the guide rail mechanism; and
the step of selectively controlling, based on a determination result, the first image acquisition module to directly obtain the first image specifically includes:
if the field of view area is greater than or equal to the lower surface area, controlling the first image acquisition module to directly obtain the first image; and/or
if the field of view area is less than the lower surface area, controlling the guide rail mechanism to drive the first image acquisition module to move, and controlling the first image acquisition module to capture a plurality of lower surface images of the used battery in a movement process, and
blending the plurality of lower surface images into a complete image, and using the complete image obtained through blending as the first image.

Solution 9. The detection method for battery swap according to solution 1, where the step of determining, based on the second image, whether the used battery is in a second anomalous state specifically includes:
invoking a first preset model for analyzing the second image;
determining, based on an analysis result, whether there is a foreign matter on a surface of the used battery; and
if there is a foreign matter on the surface of the used battery, determining that the used battery is in the second anomalous state; or
if there is no foreign matter on the surface of the used battery, determining that the used battery is not in the second anomalous state.

Solution 10. The detection method for battery swap according to solution 9, where the step of selectively uploading the second image to the server based on a determination result specifically includes:
if the used battery is in the second anomalous state, uploading the second image to the server, and sending prompt information "Remove the foreign matter"; and/or
if the used battery is not in the second anomalous state, skipping uploading the second image to the server.

Solution 11. The detection method for battery swap according to solution 9, where the step of invoking the first preset model for analyzing the second image specifically includes:
determining whether first pixels of the second image are greater than first preset pixels; and
if the first pixels are greater than the first preset pixels, dividing the second image into a plurality of first sub-images according to a first preset method, and obtaining a position of each of the first sub-images in the surface image, and
analyzing each of the first sub-images; and/or
if the first pixels are less than or equal to the first preset pixels, directly analyzing the second image.

Solution 12. The detection method for battery swap according to solution 1, where the detection method for battery swap further includes:
obtaining a surface image of a service battery at a third preset position before battery swap of a vehicle with a battery to be swapped;
determining, based on the surface image, whether the service battery is in an anomalous state; and
selectively uploading the surface image to the server based on a determination result, so that the server receives and stores the surface image,
where the third preset position is in the battery compartment.

Solution 13. The detection method for battery swap according to solution 12, where the step of determining, based on the surface image, whether the service battery is in an anomalous state specifically includes:
invoking a second preset model for analyzing the surface image;
determining, based on an analysis result, whether there is a foreign matter on a surface of the service battery; and
if there is a foreign matter on the surface of the service battery, determining that the service battery is in the anomalous state; or if there is no foreign matter on the surface of the service battery, determining that the service battery is not in the anomalous state.

Solution 14. The detection method for battery swap according to solution 13, where the step of selectively uploading the surface image to the server based on a determination result specifically includes:

if the service battery is in the anomalous state, uploading the surface image to the server, and sending prompt information "Remove the foreign matter"; and/or if the service battery is not in the anomalous state, skipping uploading the surface image to the server.

Solution 15. The detection method for battery swap according to solution 13, where the step of invoking a second preset model for analyzing the surface image specifically includes:

determining whether second pixels of the surface image are greater than second preset pixels; and if the second pixels are greater than the second preset pixels, dividing the surface image into a plurality of second sub-images according to a second preset method, and obtaining a position of each of the second sub-images in the surface image, and analyzing each of the second sub-images; and/or if the second pixels are less than or equal to the second preset pixels, directly analyzing the surface image.

Solution 16. The detection method for battery swap according to solution 12, where the battery swap station further includes a conveying mechanism and a second image acquisition module, where the conveying mechanism is configured to convey the used battery and the service battery, and the second image acquisition module is configured to acquire the surface image and the second image;

the step of obtaining a second image of the used battery at a second preset position specifically includes:

obtaining the second image by using the second image acquisition module when the used battery is detached and conveyed to the second preset position, where the second image is an image of an upper surface of the used battery; and the step of obtaining a surface image of a service battery at a third preset position specifically includes:

obtaining the surface image by using the second image acquisition module when the service battery is conveyed from the battery compartment to the third preset position, where the surface image is an image of an upper surface of the service battery.

BRIEF DESCRIPTION OF THE DRAWINGS

The following describes a detection method for battery swap in the invention with reference to the accompanying drawings and in combination with an electric vehicle. In the accompanying drawings.

DETAILED DESCRIPTION OF EMBODIMENTS

Figure 1:
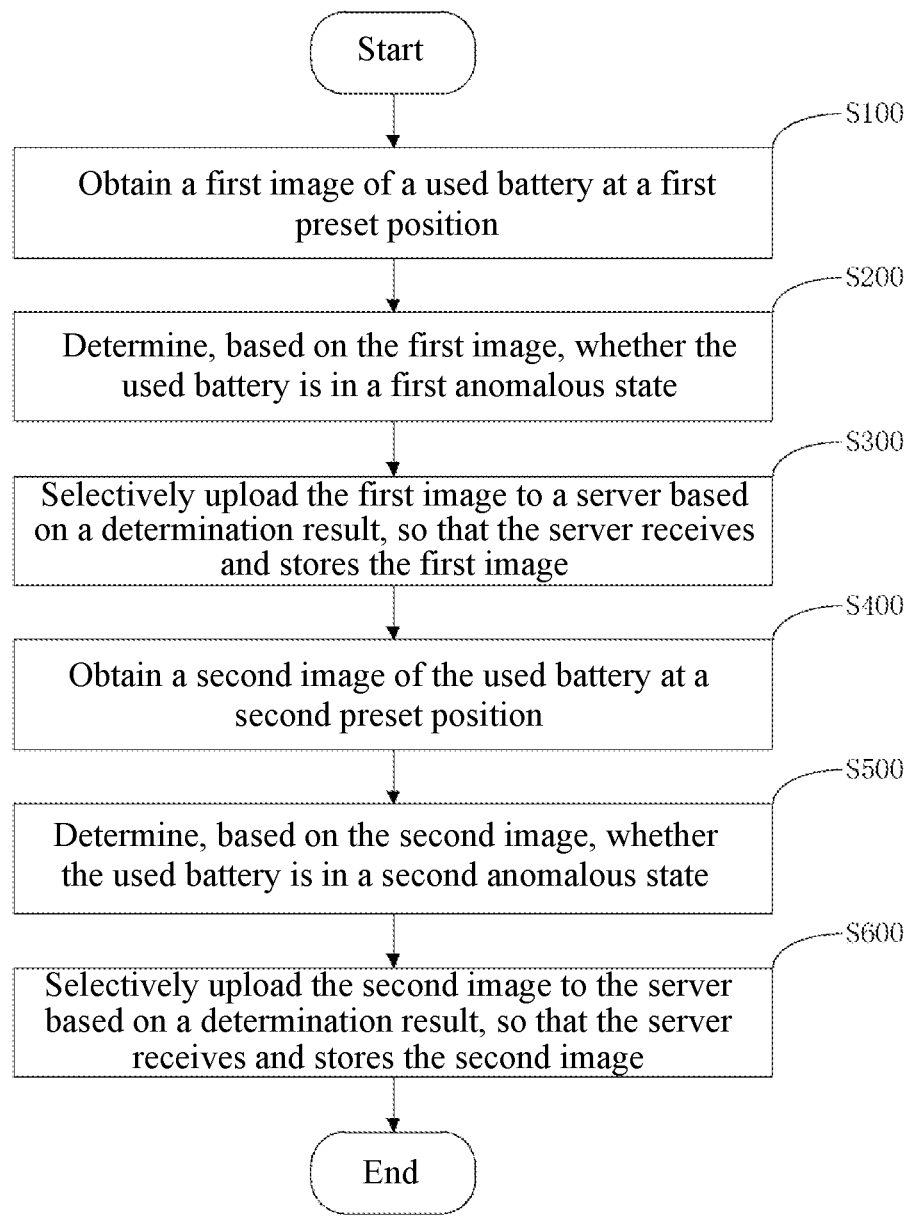
FIG. 1 is a main flowchart of a detection method for battery swap according to the invention.

Preferred embodiments of the invention are described below with reference to the accompanying drawings. It should be understood by those skilled in the art that these embodiments are only for explaining the technical principles of the invention and are not intended to limit the scope of protection of the invention. For example, although the present application is described with reference to an electric vehicle, the technical solution of the invention is not limited thereto. Certainly, the detection method for battery swap can be further applied to a hybrid vehicle or other vehicles, and this change does not depart from the principle and scope of the invention.

It should be noted that, in the description of the invention, the terms "first", "second", and "third" are merely used for description, but cannot be understood as indicating or implying the relative importance.

In addition, it should also be noted that, in the description of the invention, the term "mount" should be interpreted in a broad sense unless explicitly defined and limited otherwise, which, for example, may mean a fixed connection, a detachable connection, or an integral connection; may mean a mechanical connection or an electrical connection; or may mean a direct connection, an indirect connection by means of an intermediary, or internal communication between two elements. For those skilled in the art, the specific meaning of the above-mentioned terms in the invention can be interpreted according to the specific situation.

For the technical problem mentioned in the background art, the invention provides a detection method for battery swap in a battery swap station, and is intended to obtain a first image of a used battery at a first preset position, obtain a second image of the used battery at a second preset position, determine, based on the first image, whether the used battery is in a first anomalous state, and determine, based on the second image, whether the used battery is in the second anomalous state. Detection is performed on the used battery at the two positions, such that detection of the used battery is more comprehensive, and whether the used battery is in an anomalous state is determined twice, such that whether the used battery is anomalous can be accurately determined. This can provide grounds for reasons and responsibilities of a battery fault when there is the battery fault. Further, the first image and/or the second image are/is selectively uploaded to a server based on determination results, so that the server receives and stores the uploaded first image and/or second image. In this way, when there is a battery fault, a stored image of a faulty battery can be obtained from the server, and reasons and responsibilities of the battery fault are accurately determined based on the stored image, thereby avoiding ambiguous division of responsibilities, and ensuring accurate determination of a standard of handling the faulty battery. This provides a proper solution for handing a faulty battery, determines a standard of handling a faulty battery, and further improves user experience.

First, refer to FIG. 1, which describes a detection method for battery swap according to the invention. FIG. 1 is a main flowchart of a detection method for battery swap according to the invention.

As shown in FIG. 1, a battery swap station in the invention includes a battery swap platform and a battery compartment. The detection method for battery swap in the invention includes the following steps:

S100, obtaining a first image of a used battery at a first preset position;

S200, determining, based on the first image, whether the used battery is in a first anomalous state;

S300, selectively uploading the first image to a server based on a determination result, so that the server receives and stores the first image;

S400, obtaining a second image of the used battery at a second preset position;

S500, determining, based on the second image, whether the used battery is in a second anomalous state; and S600, selectively uploading the second image to the server based on a determination result, so that the server receives and stores the second image.

The first preset position is in the battery swap platform; and the second preset position is in the battery compartment.

The used battery is a dead battery that is to be swapped in an electric vehicle with a battery to be swapped.

The first image may be an image of a lower surface of the used battery, or may be an image of an upper surface of the used battery; and the second image may be an image of the upper surface of the used battery, or may be an image of the lower surface of the used battery.

The first anomalous state includes a scratched state; or may be a dented state or another anomalous state. An anomalous state of a service battery may be a state in which there is a foreign matter on a surface of the service battery; or may be a scratched state, a dented state, or another anomalous state on the surface of the service battery. Further, a foreign matter in the first anomalous state may be, but is not limited to, some moving parts dropped in the battery swap station, a tool left by a supervisor on the surface of the battery, etc.

The second anomalous state may be a state in which there is a foreign matter on a surface of the used battery; or may be a scratched state, a dented state, or another anomalous state on the surface of the used battery. Further, a foreign matter in the second anomalous state may be, but is not limited to, some moving parts dropped from an electric vehicle with a battery to be swapped, or an object already on the surface of the battery before the used battery is mounted onto the electric vehicle with a battery to be swapped, for example, some moving parts dropped in the battery swap station, a tool left by a supervisor on the surface of the battery, etc.

Preferably, steps S100 and S400 may be performed in a process of battery swap of the electric vehicle with a battery to be swapped; or only step S100 is performed in the process of battery swap of the electric vehicle with a battery to be swapped, and step S400 is performed after the battery swap ends, where those skilled in the art may adjust and set, with flexibility, performing occasions of steps S100 and S400 based on actual battery swap requirements.

It should be noted that in the foregoing process, an order of performing steps S200 and S500 is not limited to the foregoing described order. Step S500 may be performed before step S200, or step S200 and step S500 are performed at the same time. This is not limited in the invention.

Figure 2:
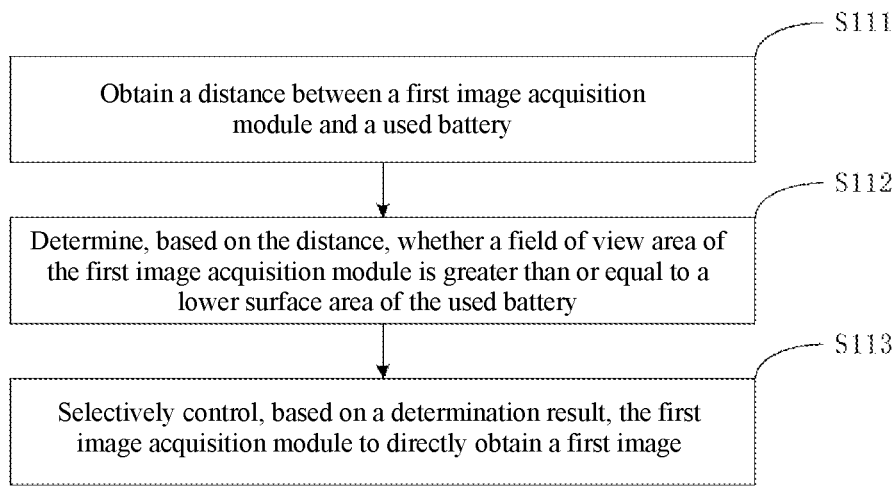
FIG. 2 is a flowchart 1 of a method for obtaining a first image of a used battery according to the invention.
Figure 3:
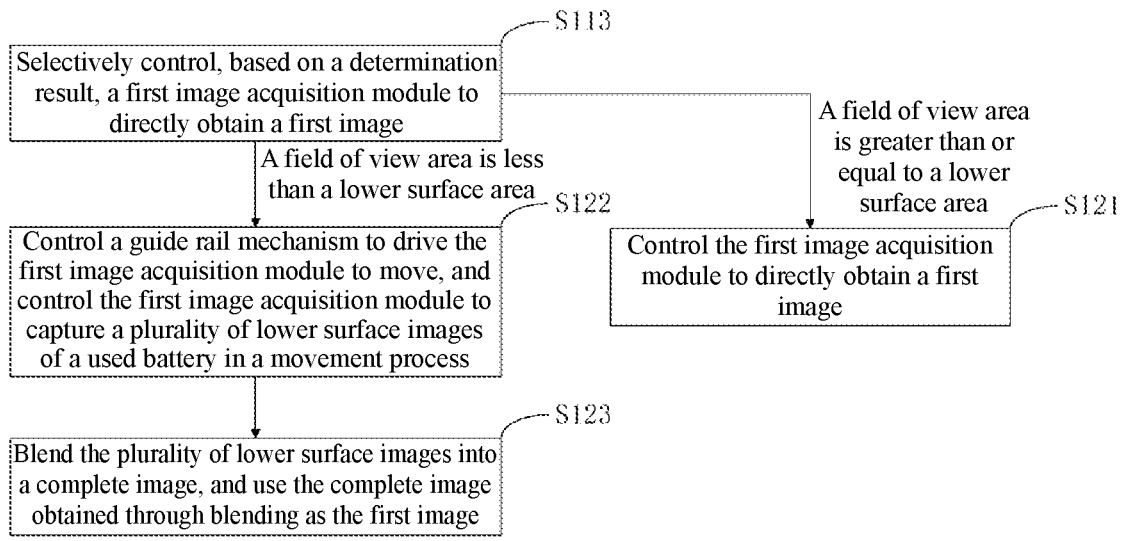
FIG. 3 is a flowchart 2 of a method for obtaining a first image of a used battery according to the invention.

A method for obtaining a first image and a second image of a used battery according to the invention is described with reference to FIGS. 2 and 3 below. FIG. 2 is a flowchart 1 of a method for obtaining a first image of a used battery according to the invention. FIG. 3 is a flowchart 2 of a method for obtaining a first image of a used battery according to the invention.

Preferably, the battery swap station further includes a first image acquisition module mounted in the battery swap platform, where the first image acquisition module is configured to acquire the first image. The used battery is mounted at the bottom of the electric vehicle. The first image acquisition module may be mounted inside the battery swap platform by using screw threads and magnets, and after the electric vehicle arrives at the battery swap platform, the first image acquisition module is under the used battery.

Further, the first image acquisition module is a three-dimensional camera, and the three-dimensional camera includes a structured light projection module, a camera, and a central processing unit, where the three-dimensional camera obtains a three-dimensional image of an object based on a principle of structured light, and accordingly, the first image is a three-dimensional image.

Preferably, the structured light projection module is a digital light processing (DLP) module. Certainly, the structured light projection module may alternatively be a micro-electromechanical system (MEMS) module, a digital micromirror device (DMD) module, or other modules.

In step S100, the first image is obtained by using the first image acquisition module after the electric vehicle with a battery to be swapped arrives at the battery swap platform.

The first image is an image of the lower surface of the used battery, and preferably, the first image is a three-dimensional image of the lower surface of the used battery.

As shown in FIG. 2, the step of obtaining the first image by using the first image acquisition module specifically includes:

S111, obtaining a distance between the first image acquisition module and the used battery;

S112, determining, based on the distance, whether a field of view area of the first image acquisition module is greater than or equal to a lower surface area of the used battery; and S113, selectively controlling, based on a determination result, the first image acquisition module to directly obtain the first image.

Heights of chassis of different types of electric vehicles are different, so that heights of used batteries mounted at the bottom of the electric vehicles are also different, and therefore, distances between first image acquisition modules and the used batteries are different. In addition, sizes of batteries mounted on different types of electric vehicles may also be different, and therefore, when a first image acquisition module is relatively close to a used battery, the first image acquisition module may not be able to photograph a whole lower surface of the used battery, causing incapability to accurately determine whether the used battery is in a first anomalous state. To prevent this problem, steps S111 to S113 are performed. To be specific, a distance between the first image acquisition module and the used battery is obtained; whether a field of view area of the first image acquisition module is greater than or equal to a lower surface area of the used battery is determined based on the distance; and the first image acquisition module is selectively controlled based on a determination result to directly obtain a first image.

In step S111, the first image acquisition module is a three-dimensional camera, so that the three-dimensional camera can determine the distance based on detected three-dimensional coordinates of each point, and therefore, the first image acquisition module can measure the distance by itself. Alternatively, the battery swap platform is provided with a distance sensor, or the first image acquisition module is provided with a distance sensor, and the distance sensor is used to detect the distance between the first image acquisition module and the used battery. The distance sensor may be a radar sensor or an infrared sensor. A specific detection method corresponding to any type of sensor used to detect the distance between the first image acquisition module and the used battery shall not constitute a limitation on the invention.

In step S112, the distance between the first image acquisition module and the used battery is in direct proportion to the field of view area of the first image acquisition module. The field of view area of the first image acquisition module may be determined through table look-up based on a table of a correspondence between the distance and the field of view area. Certainly, the field of view area of the first image acquisition module may alternatively be calculated by using other relations of the distance and the field of view area.

It should be noted that, if a distance between a first image acquisition module and a used battery mounted on any type of electric vehicle is always long enough, and a condition that a field of view area of the first image acquisition module is greater than or equal to a lower surface area of the used battery is always satisfied, it is only required to fixedly mount the first image acquisition module.

As shown in FIG. 3, the battery swap station may further include a guide rail mechanism, and the first image acquisition module is mounted on the guide rail mechanism. In step S113, the step of selectively controlling, based on a determination result, the first image acquisition module to directly obtain the first image specifically includes:

S121, if the field of view area is greater than or equal to the lower surface area, controlling the first image acquisition module to directly obtain the first image;

S122, if the field of view area is less than the lower surface area, controlling the guide rail mechanism to drive the first image acquisition module to move, and controlling the first image acquisition module to capture a plurality of lower surface images of the used battery in a movement process; and S123, blending the plurality of lower surface images into a complete image, and using the complete image obtained through blending as the first image.

In step S121, if the field of view area is greater than or equal to the lower surface area, where for example, the lower surface area of the used battery is 4 $m^2$, and the field of view area is 5 $m^2$, which is greater than the lower surface area of the used battery, an image captured by the first image acquisition module can cover the whole used battery, a complete image of the lower surface of the used battery can be obtained, and the first image acquisition module is controlled to directly obtain the first image.

In steps S122 and S123, if the field of view area is greater than or equal to the lower surface area, where for example, the lower surface area of the used battery is 4 $m^2$, and the field of view area is 3 $m^2$, which is less than the lower surface area of the used battery, an image captured by the first image acquisition module at a fixed position can cover only a part of the used battery, and a complete image of the lower surface of the used battery cannot be obtained. To ensure completeness of the obtained the lower surface image of the used battery, the guide rail mechanism is controlled to drive the first image acquisition module to move, and the first image acquisition module is controlled to capture a plurality of lower surface images of the used battery in a movement process, for example, two, three, four, or five images. The number of lower surface images of the used battery that are captured only needs to ensure that a complete image obtained by blending the plurality of lower surface images can cover the entire lower surface of the used battery such that the completeness of the image of the lower surface of the used battery is ensured.

It should be noted that, the above-listed lower surface area and field of view area are only exemplary but not limiting. Those skilled in the art may determine the lower surface area based on an actual condition of the used battery in actual application, and determine the field of view area based on a type of the first image acquisition module and the distance between the first image acquisition module and the used battery.

It should also be noted that in the foregoing process, there is no sequential order between steps S121 and S122 that are parallel. The order is only related to the determination result of whether the field of view area of the first image acquisition module is greater than or equal to the lower surface area of the used battery. Steps only need to be performed correspondingly based on different determination results.

Preferably, the battery swap station further includes a conveying mechanism and a second image acquisition module, where the conveying mechanism is configured to convey the used battery, and the second image acquisition module is configured to acquire the second image. Further, the second image acquisition module is a two-dimensional camera. Certainly, the second image acquisition module may alternatively be a three-dimensional camera.

In step S400, the step of obtaining a second image of the used battery at a second preset position specifically includes: obtaining the second image by using the second image acquisition module when the used battery is detached and conveyed to the second preset position.

The used battery is under the second image acquisition module when the used battery is conveyed to the second preset position, and therefore, an image of the upper surface of the used battery is obtained by the second image acquisition module.

Preferably, the second preset position is any position in the battery compartment within a field of view coverage of the second image acquisition module provided that the second image acquisition module can capture an image of the entire upper surface of the used battery.

Figure 4:
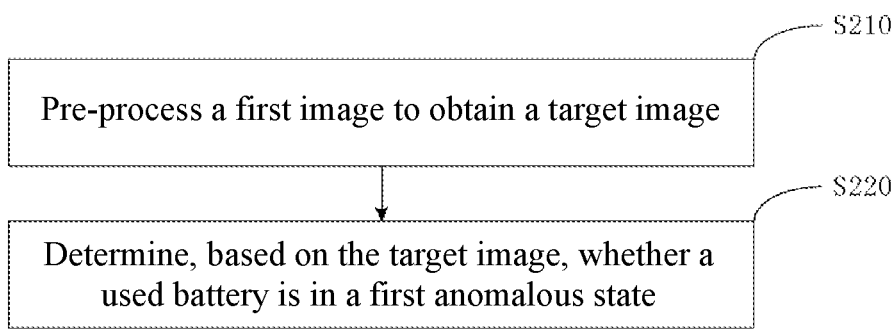
FIG. 4 is a flowchart of a method for determining whether a used battery is in a first anomalous state according to the invention.
Figure 5:
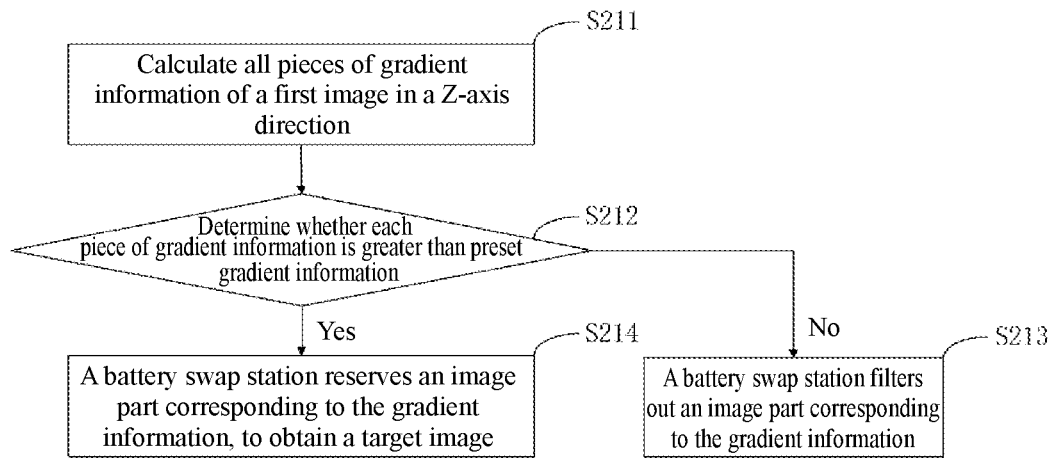
FIG. 5 is a flowchart of a method for obtaining a target image according to the invention.
Figure 6:
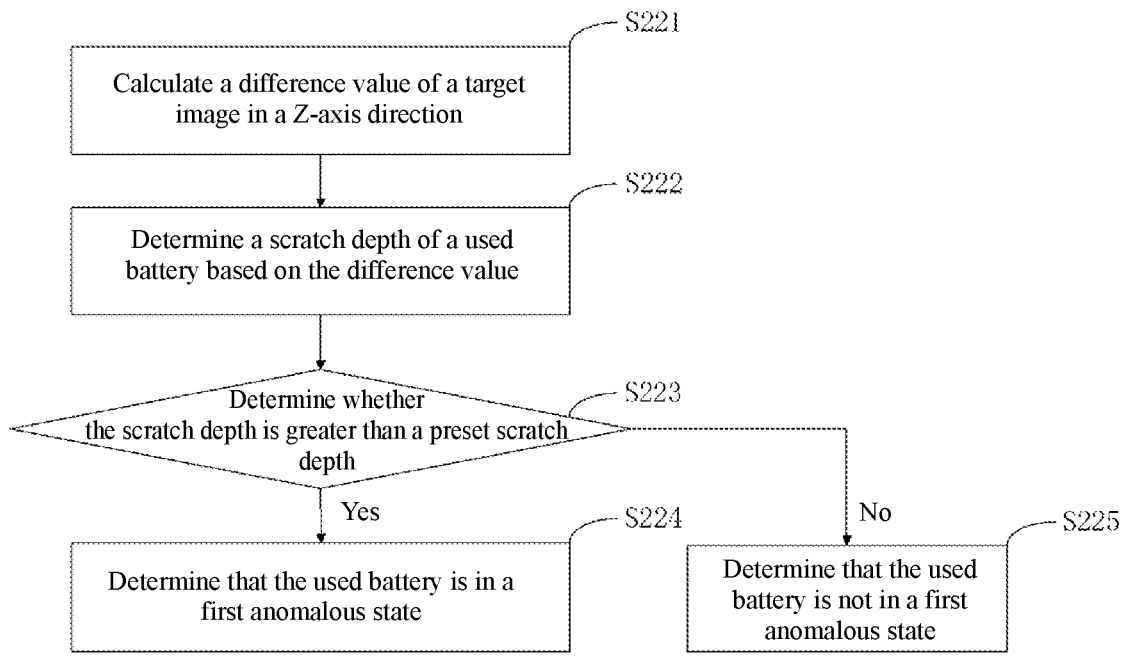
FIG. 6 is a flowchart of a method for determining, based on a target image, whether a used battery is in a first anomalous state according to the invention.
Figure 7:
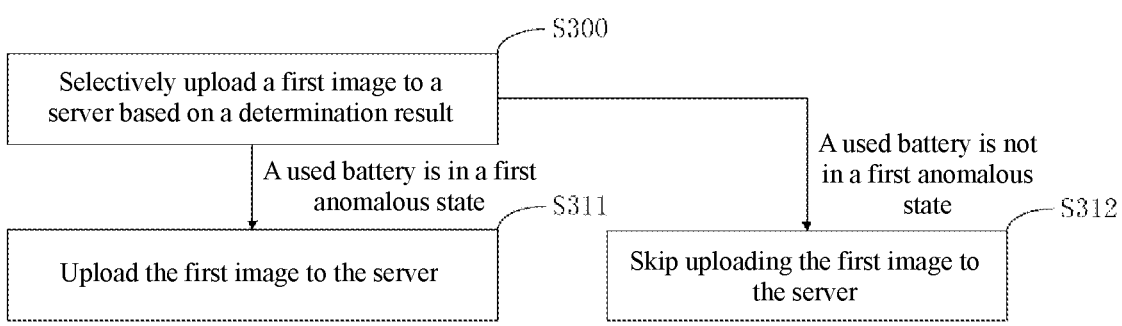
FIG. 7 is a flowchart of a method for selectively uploading a first image to a server according to the invention.

A method for determining whether the used battery is in the first anomalous state and selectively uploading the first image to the server according to the invention is described with reference to FIGS. 4 to 7 below and by using an example in which the first anomalous state is a scratched state and the first image is a three-dimensional image. FIG. 4 is a flowchart of a method for determining whether a used battery is in a first anomalous state according to the invention. FIG. 5 is a flowchart of a method for obtaining a target image according to the invention. FIG. 6 is a flowchart of a method for determining, based on a target image, whether a used battery is in a first anomalous state according to the invention. FIG. 7 is a flowchart of a method for selectively uploading a first image to a server according to the invention.

As shown in FIG. 4, in step S200, the step of determining, based on the first image, whether the used battery is in a first anomalous state specifically includes:

S210, pre-processing the first image to obtain a target image; and

S220, determining, based on the target image, whether the used battery is in the first anomalous state.

As shown in FIG. 5, in step S210, the step of pre-processing the first image to obtain a target image specifically includes:

S211, calculating all pieces of gradient information of the first image in a Z-axis direction;

S212, determining whether each piece of gradient information is greater than preset gradient information; and if each piece of gradient information is not greater than the preset gradient information, performing step S213; or if each piece of gradient information is greater than the preset gradient information, performing step S214; and S213, filtering out, by the battery swap station, an image part corresponding to the gradient information; or S214, reserving, by the battery swap station, an image part corresponding to the gradient information, to obtain the target image.

The Z-axis direction is a height direction, that is, a direction of a dent of a scratch.

The gradient information is a derivative in the Z-axis direction along an XY plane.

In step S211, it is assumed that the gradient information obtained by calculation is 2 and 0.2. Certainly, the number of pieces and a value of the gradient information that are obtained by calculation are not limited to the above-listed number and values. Those skilled in the art may calculate all pieces of gradient information of an actual first image in the Z-axis direction based on the actual first image. In addition, a method for calculating the gradient information of the image in the Z-axis direction is common knowledge of those skilled in the art. Details are not provided herein again.

In step S213, if the gradient information is less than or equal to the preset gradient information, where for example, the preset gradient information is 1, and the gradient information obtained by calculation in step S211 is 0.2, which is less than the preset gradient information, it may be the case of a background image, or may be the case that a part of the lower surface of the used battery that is corresponding to the gradient information is relatively smooth. In either of the cases, it may be considered that the part corresponding to the gradient information has no scratches, dents, etc., and the image part corresponding to the gradient information is filtered out, to reduce a size of the target image, and further to quickly determine the first anomalous state.

In step S214, if the gradient information is greater than the preset gradient information, where for example, the preset gradient information is 1, and the gradient information obtained by calculation in step S211 is 2, which is greater than the preset gradient information, it indicates that the image part corresponding to the gradient information has scratches, dents, etc., and the battery swap station reserves the image part corresponding to the gradient information, to obtain the target image and determine, based on the target image, whether the used battery is in the first anomalous state.

As shown in FIG. 6, in step S220, the step of determining, based on the target image, whether the used battery is in the first anomalous state specifically includes:

S221, calculating a difference value of the target image in the Z-axis direction;

S222, determining a scratch depth of the used battery based on the difference value;

S223, determining whether the scratch depth is greater than a preset scratch depth; and if the scratch depth is greater than the preset scratch depth, performing step S224; or if the scratch depth is not greater than the preset scratch depth, performing step S225; and S224, determining that the used battery is in the first anomalous state; or S225, determining that the used battery is not in the first anomalous state.

The difference value in the Z-axis direction is a difference value between two adjacent points in a point cloud image of the target image, or a difference value between a maximum value and a minimum value in the Z-axis direction, or a difference value between a maximum value or a minimum value and a preset value (for example, 0) in the Z-axis direction. In actual application, the preset value may be adjusted according to an establishment criterion of a three-dimensional coordinate system.

In step S221, $\Delta Z$ may be obtained by calculation based on a difference value between two adjacent points $Z_1$ and $Z_2$ in the point cloud image of the target image, that is, $\Delta Z=Z_1-Z_2$. For example, $Z_1$ is 3, $Z_2$ is $-2$, and $\Delta Z$ is 5.

Alternatively, $\Delta Z$ may be obtained by calculation based on the maximum value $Z_{max}$ and the minimum value $Z_{min}$ in the Z-axis direction, that is, $\Delta Z=Z_{max}-Z_{min}$. For example, $Z_{max}$ is 3, $Z_{min}$ is $-2$, and $\Delta Z$ is 5.

Alternatively, $\Delta Z$ may be obtained by calculation based on the maximum value $Z_{max}$ and the preset value $Z_0$ in the Z-axis direction, that is, $\Delta Z=Z_{max}-Z_0$. For example, $Z_{max}$ is 3, $Z_0$ is 0, and $\Delta Z$ is 3.

Alternatively, $\Delta Z$ may be obtained by calculation based on the minimum value $Z_{min}$ and the preset value $Z_0$ in the Z-axis direction, that is, $\Delta Z=Z_0-Z_{min}$. For example, $Z_0$ is 0, $Z_{min}$ is $-2$, and $\Delta Z$ is 2.

In step S222, the difference value of the target image in the Z-axis direction is in direct proportion to the scratch depth of the used battery. The scratch depth of the used battery may be determined through table look-up based on a table of a correspondence between the difference value and the scratch depth. Certainly, the scratch depth of the used battery may alternatively be calculated by using other relations of the difference value and the scratch depth.

For example, when $\Delta Z$ is 5, the corresponding scratch depth is 5 mm; when $\Delta Z$ is 3, the corresponding scratch depth is 3 mm; or when $\Delta Z$ is 2, the corresponding scratch depth is 2 mm.

In step S224, if the scratch depth is greater than the preset scratch depth, where for example, the preset scratch depth is 2.5 mm, and the scratch depth determined in step S222 is 5 mm, which is greater than the preset scratch depth, it indicates that the scratch is very deep, and a degree to which the used battery is damaged is very severe. For another example, the scratch depth determined in step S222 is 3 mm, which is greater than the preset scratch depth, it indicates that the scratch is relatively deep, and a degree to which the used battery is damaged is relatively severe. In either of the cases, it can be determined that the used battery is in the first anomalous state.

In step S225, if the scratch depth is less than or equal to the preset scratch depth, where for example, the preset scratch depth is 2.5 mm, and the scratch depth determined in step S222 is 2 mm, which is less than the preset scratch depth, it indicates that the scratch is relatively shallow, and a degree to which the used battery is damaged is not severe. In this case, it may be determined that the used battery is not in the first anomalous state.

As shown in FIG. 7, in step S300, the step of selectively uploading the first image to a server based on a determination result specifically includes:

S311, if the used battery is in the first anomalous state, uploading the first image to the server; or S312, if the used battery is not in the first anomalous state, skipping uploading the first image to the server.

In step S311, if the used battery is in the first anomalous state, it indicates that the scratch depth is greater than the preset scratch depth, the scratch is relatively deep or very deep, and a degree to which the used battery is damaged is relatively or very severe. In either of the cases, the first image is uploaded to the server. When there is a battery fault, a stored image of the battery can be obtained from the server, and reasons and responsibilities of the battery fault are accurately determined based on the stored image, thereby ensuring accurate determination of a standard of handling the faulty battery. This provides a proper solution for handling a faulty battery, and determines a standard of handling the faulty battery.

In step S312, if the used battery is not in the first anomalous state, it indicates that the scratch depth is less than or equal to the preset scratch depth, the scratch is relatively shallow, and a degree to which the used battery is damaged is not severe. In this case, the first image is not uploaded to the server, thereby reducing the number of images stored in the server. When there is a battery fault, a stored image of the faulty battery can be quickly found. This further improves user experience.

Further, in the foregoing process, a standard of handling a battery fault of the used battery is checked based on the scratch depth determined above. For example, the preset scratch depth includes a first scratch threshold and a second scratch threshold, where the first scratch threshold is less than the second scratch threshold. For example, the first scratch threshold is 2.5 mm, and the second scratch threshold is 4 mm. If the scratch depth of the used battery is 5 mm, which is greater than the second scratch threshold, the first image is uploaded to the server, and the used battery is detached on site for eliminating danger and sent back to the factory for repair after danger eliminating. If the scratch depth of the used battery is 3 mm which is between the first scratch threshold and the second scratch threshold, the first image is uploaded to the server, and the used battery is directly sent back to the factory for repair. If the scratch depth of the used battery is 2 mm, which is less than the first scratch threshold, the first image is not uploaded to the server.

It should be noted that, $Z_{max}$, $Z_{min}$, $Z_0$, $\Delta Z$, the scratch depth, and the preset scratch depth listed above are only exemplary but not limiting. Those skilled in the art may determine $Z_{max}$, $Z_{min}$, $Z_0$, $\Delta Z$, the scratch depth, and the preset scratch depth based on actual detection results and detection precision in actual application.

It should also be noted that in the foregoing process, there is no sequential order between steps S213 and S214 that are parallel. The order is only related to the determination result of whether the gradient information is greater than the preset gradient information. Steps only need to be performed correspondingly based on different determination results. There is no sequential order between steps S224 and S225 that are parallel. The order is only related to the determination result of whether the scratch depth is greater than the preset scratch depth. Steps only need to be performed correspondingly based on different determination results. There is no sequential order between steps S311 and S312 that are parallel. The order is only related to the determination result of whether the used battery is in the first anomalous state. Steps only need to be performed correspondingly based on different determination results.

Figure 8:
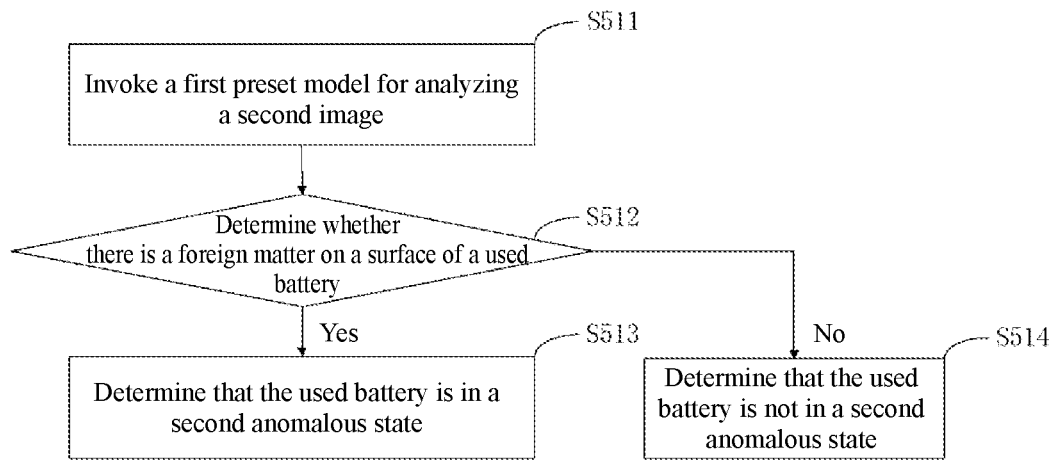
FIG. 8 is a flowchart of a method for determining whether a used battery is in a second anomalous state according to the invention.
Figure 9:
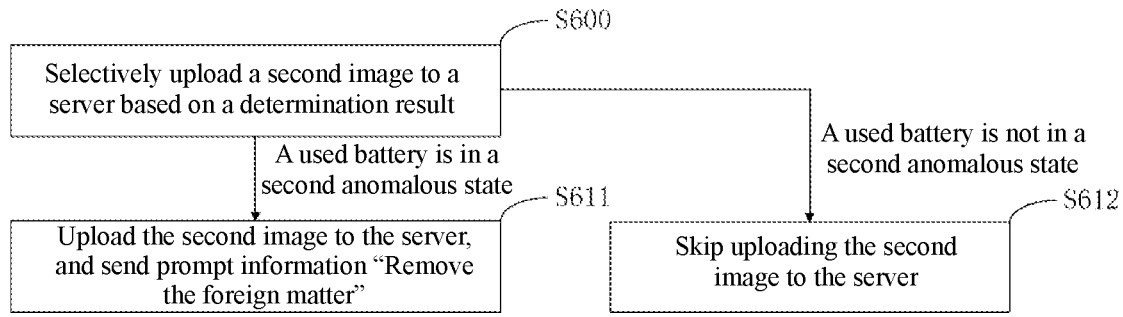
FIG. 9 is a flowchart of a method for selectively uploading a second image to a server according to the invention.
Figure 10:
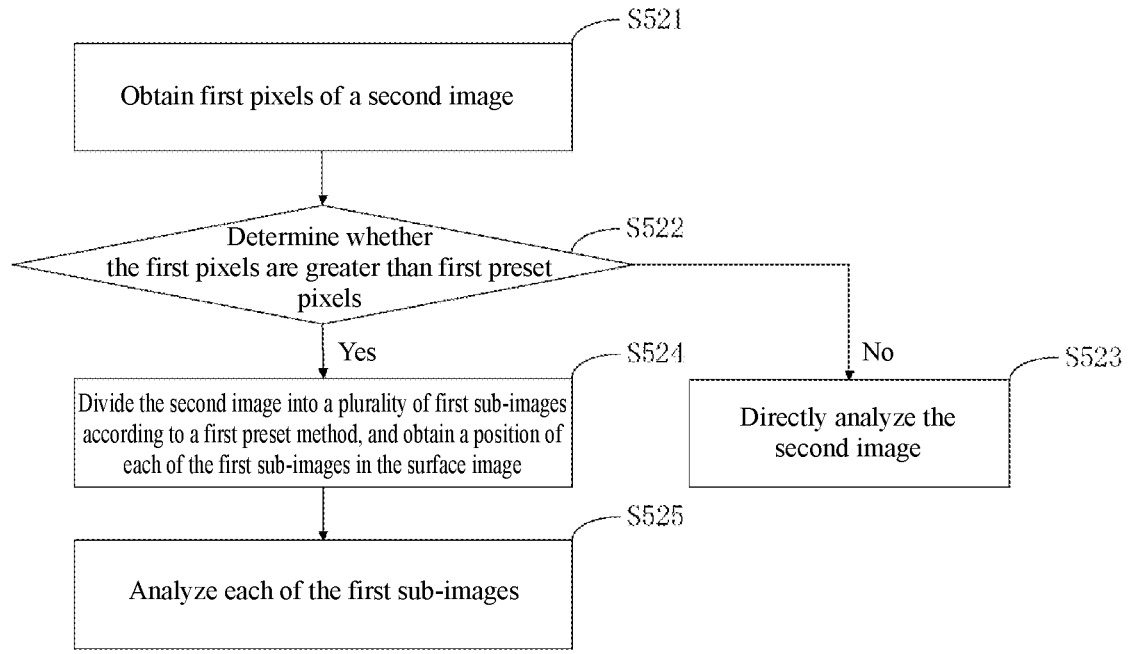
FIG. 10 is a flowchart of a method for analyzing a second image according to the invention.

A method for determining whether the used battery is in the second anomalous state and selectively uploading the second image to the server according to the invention is described with reference to FIGS. 8 to 10 below. FIG. 8 is a flowchart of a method for determining whether a used battery is in a second anomalous state according to the invention. FIG. 9 is a flowchart of a method for selectively uploading a second image to a server according to the invention. FIG. 10 is a flowchart of a method for analyzing a second image according to the invention.

As shown in FIG. 8, the battery swap station pre-stores a first preset model. In step S500, the step of determining, based on the second image, whether the used battery is in a second anomalous state specifically includes:

S511, invoking the first preset model for analyzing the second image;

S512, determining, based on an analysis result, whether there is a foreign matter on a surface of the used battery; and if there is a foreign matter on the surface of the used battery, performing step S513; or if there is no foreign matter on the surface of the used battery, performing step S514; and S513, determining that the used battery is in the second anomalous state; or S514, determining that the used battery is not in the second anomalous state.

The first preset model is a deep learning model. Preferably, the deep learning model is an object detection model, where the object detection model may be, but is not limited to, a YOLO V5 model, a Faster RCNN model, a ResNet101 model, a DeeplabV3+ model, an FCOS model, etc.

In step S513, if there is a foreign matter on the surface of the used battery, it may be considered that some moving parts dropped from an electric vehicle with a battery to be swapped, a tool left by a user of the electric vehicle with a battery to be swapped on the surface of the battery, or an object already on the surface of the battery before the used battery is mounted onto the electric vehicle with a battery to be swapped is on the surface of the used battery, and the used battery is in the second anomalous state.

In step S514, if there is no foreign matter on the surface of the used battery, it may be considered that there is not any foreign matter on the surface of the used battery, and it may be considered that the used battery is not in the second anomalous state.

As shown in FIG. 9, in step S600, the step of selectively uploading the second image to the server based on a determination result specifically includes:

S611, if the used battery is in the second anomalous state, uploading the second image to the server, and sending prompt information "Remove the foreign matter"; or S612, if the used battery is not in the second anomalous state, skipping uploading the second image to the server.

In step S611, if the used battery is in the second anomalous state, it indicates that some moving parts dropped from an electric vehicle with a battery to be swapped or an object already on the surface of the battery before the used battery is mounted onto the electric vehicle with a battery to be swapped is on the surface of the used battery. In this case, the second image is uploaded to the server, and the prompt information "Remove the foreign matter" is sent, to prompt operating personnel in the battery swap station to take away the foreign matter. When there is a battery fault, a stored image of the battery can be obtained from the server, and reasons and responsibilities of the battery fault are accurately determined based on the stored image, thereby ensuring accurate determination of a standard of handling the faulty battery. This provides a proper solution for handing a faulty battery, and determines a standard of handling the faulty battery.

Preferably, the prompt information "Remove the foreign matter" may be sent by means of a speech, an image, a sound, light, etc.

In step S612, if the used battery is not in the second anomalous state, it indicates that there is not any foreign matter on the surface of the used battery. In this case, the second image does not need to be uploaded to the server, thereby reducing the number of images stored in the server. When there is a battery fault, a stored image of a faulty battery can be quickly found. This further improves user experience.

Further, if the used battery is neither in the first anomalous state nor in the second anomalous state, it indicates that the used battery is normal, and it is only required to convey the used battery to the battery compartment of the battery swap station for charging.

As shown in FIG. 10, in step S511, the step of invoking the first preset model for analyzing the second image specifically includes:

S521, obtaining first pixels of the second image;

S522, determining whether the first pixels are greater than first preset pixels; and if the first pixels are not greater than the first preset pixels, performing step S523; or if the first pixels are greater than the first preset pixels, performing step S524;

S523, directly analyzing the second image; or

S524, dividing the second image into a plurality of first sub-images according to a first preset method, and obtaining a position of each of the first sub-images in the surface image; and S525, analyzing each of the first sub-images.

In step S523, if the first pixels are less than or equal to the first preset pixels, where for example, the first preset pixels are 15 million pixels, and the first pixels obtained in step S521 are 15 million pixels, which are less than the first preset pixels, it indicates that the second image is relatively small, such that an analysis result can be quickly obtained, because the second image can be directly analyzed without a need to divide the surface image.

In steps S524 and S525, if the first pixels are greater than the first preset pixels, where for example, the first preset pixels are 15 million pixels, and the first pixels obtained in step S521 are 23 million pixels, which are greater than the first preset pixels, it indicates that the second image is relatively large, such that an analysis speed is relatively slow, and it takes a relatively long time to obtain an analysis result. To speed up the analysis, the second image is divided into the plurality of first sub-images according to the first preset method, and the position of each of the first sub-images in the second image is obtained. Each of the first sub-images is analyzed, and an analysis result of each of the first sub-images is marked in the second image based on a position corresponding to the first sub-image, thereby obtaining the analysis result of the second image.

The first preset method may be that the second image is divided into M parts, for example, 5, 8, 12, or 16 parts, based on a size of the second image, where M is a positive integer. Each part of image is captured, and the captured image is used as a first sub-image. Alternatively, the first preset method may be that different slider boxes are provided, and an image in each slider box is captured, and the captured image is used as a first sub-image. Certainly, the first preset method is not limited to the method listed above. Any method can be used provided that the surface image can be divided into a plurality of first sub-images.

It should be noted that, the first pixels and the first preset pixels listed above are only exemplary but not limiting. Those skilled in the art may determine the first pixels and the first preset pixels based on actual detection results and preset model processing speeds in actual application.

It should also be noted that in the foregoing process, there is no sequential order between steps S513 and S514 that are parallel. The order is only related to the determination result of whether there is a foreign matter on the surface of the used battery. Steps only need to be performed correspondingly based on different determination results. There is no sequential order between steps S611 and S612 that are parallel. The order is only related to the determination result of whether the used battery is in the second anomalous state. Steps only need to be performed correspondingly based on different determination results. There is no sequential order between steps S523 and S524 that are parallel. The order is only related to the determination result of whether the first pixels are greater than the first preset pixels. Steps only need to be performed correspondingly based on different determination results.

Figure 11:
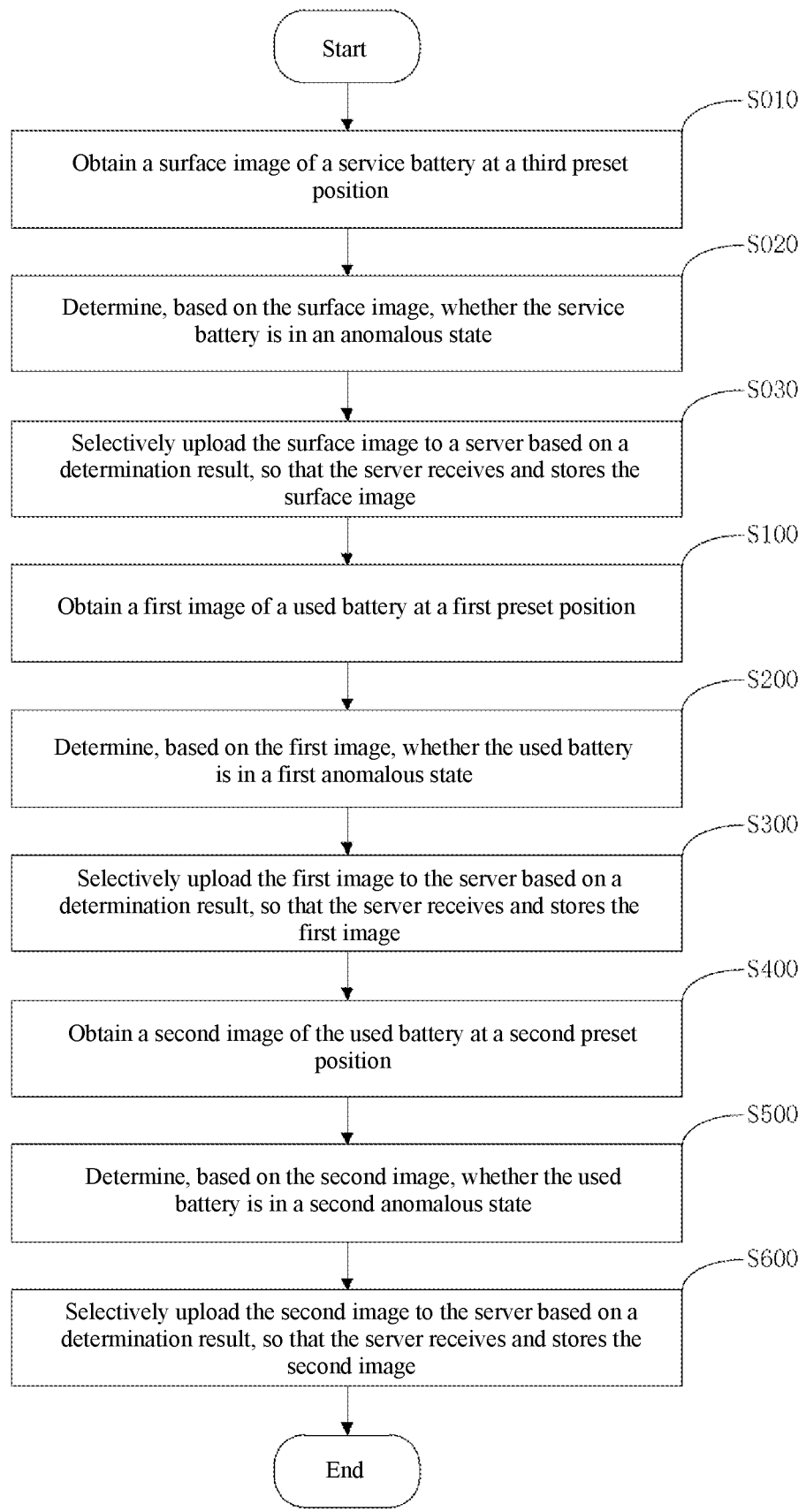
FIG. 11 is a complete flowchart of a detection method for battery swap according to the invention.
Figure 12:
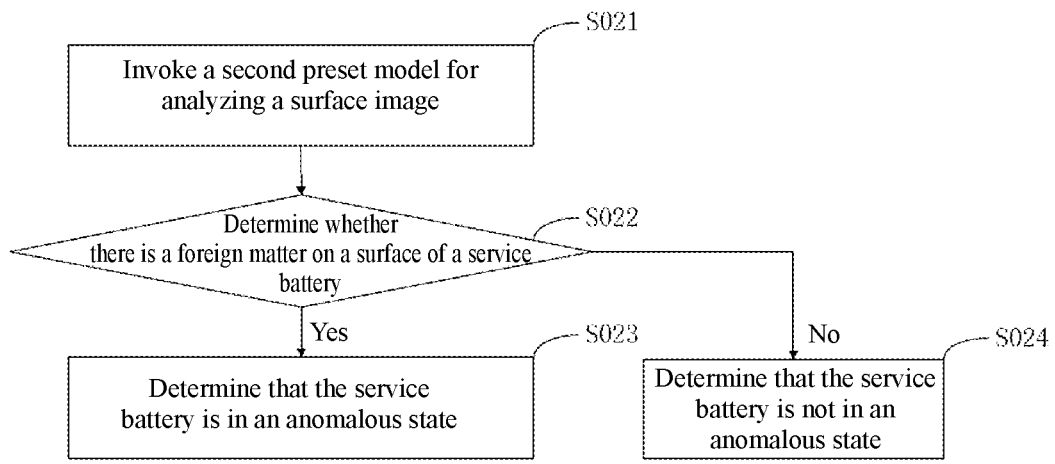
FIG. 12 is a flowchart of a method for determining whether a service battery is in an anomalous state according to the invention.
Figure 13:
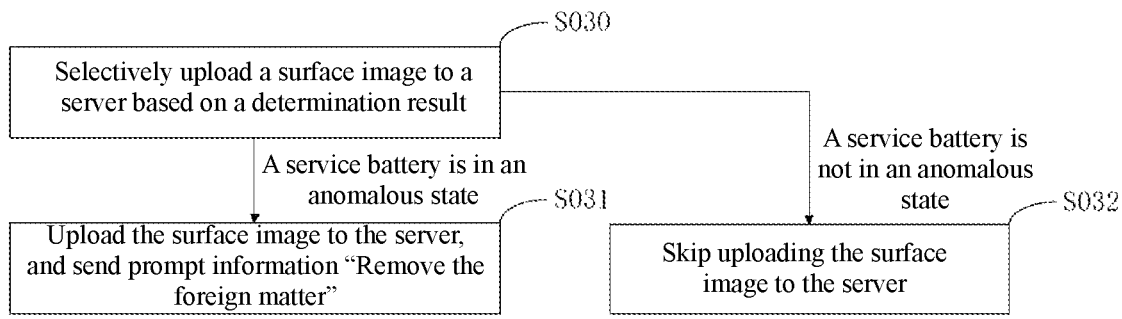
FIG. 13 is a flowchart of a method for selectively uploading a surface image to a server according to the invention.
Figure 14:
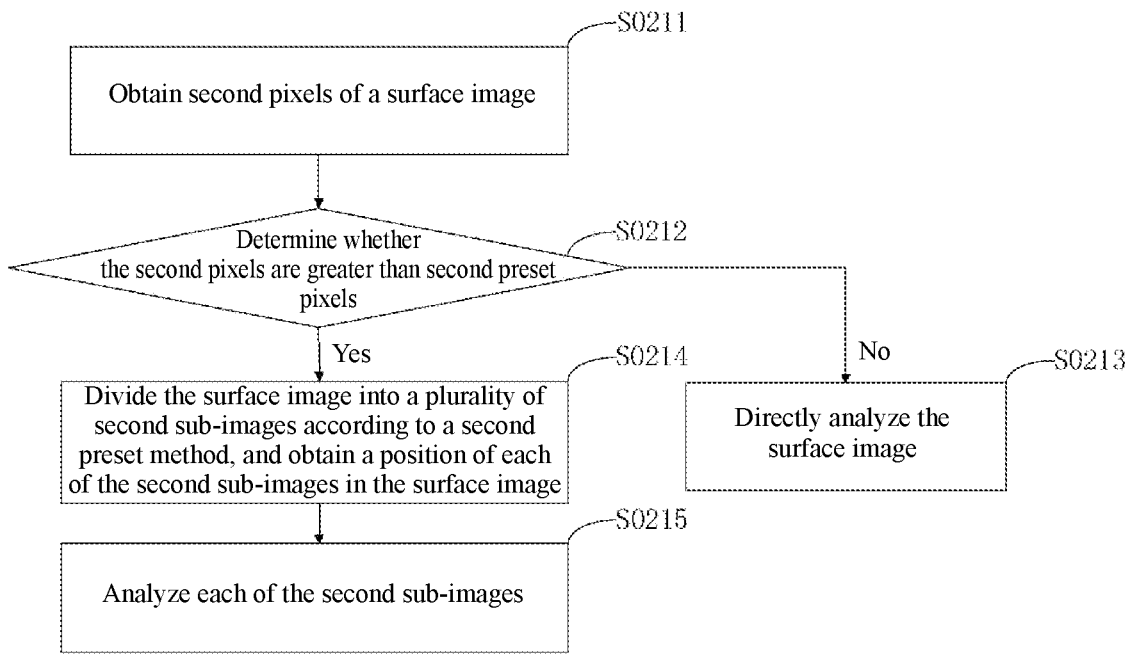
FIG. 14 is a flowchart of a method for analyzing a surface image according to the invention.

The detection method for battery swap according to the invention is further described with reference to FIGS. 11 to 14 below. FIG. 11 is a complete flowchart of a detection method for battery swap according to the invention. FIG. 12 is a flowchart of a method for determining whether a service battery is in an anomalous state according to the invention. FIG. 13 is a flowchart of a method for selectively uploading a surface image to a server according to the invention. FIG. 14 is a flowchart of a method for analyzing a surface image according to the invention.

As shown in FIG. 11, before battery swap of an electric vehicle with a battery to be swapped, the detection method for battery swap further includes:

S010, obtaining a surface image of a service battery at a third preset position;

S020, determining, based on the surface image, whether the service battery is in an anomalous state; and S030, selectively uploading the surface image to the server based on a determination result, so that the server receives and stores the surface image.

The service battery is a battery to be mounted onto the electric vehicle with a battery to be swapped, which may be a fully-charged battery, or may be a battery with a state of charge greater than a preset value. The preset value may be 60% to 90% of a total state of charge.

The surface image may be an image of an upper surface of the service battery, or may be an image of a lower surface of the service battery.

An anomalous state of the service battery may be a state in which there is a foreign matter on a surface of the service battery; or may be a scratched state, a dented state, or another anomalous state on the surface of the service battery.

By using the foregoing method, before battery swap of an electric vehicle with a battery to be swapped, the surface image of the service battery is obtained at the third preset position, and whether the service battery is in the anomalous state is determined based on the surface image. Detection is performed not only on the used battery but also on the service battery, and whether the service battery is in the anomalous state is also determined, such that whether the service battery is anomalous can be accurately determined. This can provide more grounds for reasons and responsibilities of a battery fault when there is the battery fault. Further, the surface image is selectively uploaded to the server based on the determination result, so that the server receives and stores the uploaded surface image. In this way, when there is a battery fault, reasons and responsibilities of the battery fault are more accurately determined, thereby further avoiding ambiguous division of responsibilities, and ensuring more precise determination of a standard of handling the battery. This provides a more proper solution for handing a battery, determines a standard of handling the battery, and further improves user experience.

Preferably, the conveying mechanism is further configured to convey the service battery, and the second image acquisition module is configured to acquire the surface image.

In step S010, the step of obtaining a surface image of a service battery at a third preset position specifically includes: obtaining the surface image by using the second image acquisition module when the service battery is conveyed from the battery compartment to the third preset position.

The service battery is under the second image acquisition module when the service battery is conveyed from the battery compartment to the third preset position, and therefore, an image of the upper surface of the service battery is obtained by the second image acquisition module.

The third preset position is in the battery compartment. Preferably, the third preset position is any position within a field of view coverage of the second image acquisition module provided that the second image acquisition module can capture an image of the entire upper surface of the service battery. In addition, the second preset position and the third preset position may be the same, or may be different.

As shown in FIG. 12, the battery swap station pre-stores a second preset model. In step S020, the step of determining, based on the surface image, whether the service battery is in an anomalous state specifically includes:

S021, invoking the second preset model for analyzing the surface image;

S022, determining, based on an analysis result, whether there is a foreign matter on the surface of the service battery; and if there is a foreign matter on the surface of the service battery, performing step S023; or if there is no foreign matter on the surface of the service battery, performing step S024; and S023, determining that the service battery is in the anomalous state; or S024, determining that the service battery is not in the anomalous state.

The first preset model invoked in step S511 and the second preset model invoked in step S021 may be the same model. Certainly, in actual application, two models may be configured, and the models are invoked separately in steps S511 and S021.

In step S023, if there is a foreign matter on the surface of the service battery, it may be considered that some moving parts dropped in the battery swap station, a tool left by a supervisor on the surface of the battery, or other foreign matters are on the surface of the service battery, and it may be considered that the service battery is in the anomalous state.

In step S024, if there is no foreign matter on the surface of the service battery, it may be considered that there is not any foreign matter on the surface of the service battery, and it may be considered that the service battery is not in the anomalous state.

As shown in FIG. 13, in step S030, the step of selectively uploading the surface image to the server based on a determination result specifically includes:

S031, if the service battery is in the anomalous state, uploading the surface image to the server, and sending prompt information "Remove the foreign matter"; or S032, if the service battery is not in the anomalous state, skipping uploading the surface image to the server.

In step S031, if the service battery is in the anomalous state, it indicates that some moving parts dropped in the battery swap station, a tool left by a supervisor on the surface of the battery, or other foreign matters are on the surface of the service battery. In this case, the surface image is uploaded to the server, and the prompt information "Remove the foreign matter" is sent, to prompt operating personnel in the battery swap station to take away the foreign matter. When there is a battery fault, a stored image of the battery can be obtained from the server, and reasons and responsibilities of the battery fault are accurately determined based on the stored image, thereby ensuring accurate determination of a standard of handling the faulty battery. This provides a proper solution for handing a faulty battery, and determines a standard of handling the faulty battery.

Preferably, the prompt information "Remove the foreign matter" may be sent by means of a speech, an image, a sound, light, etc.

In step S032, if the service battery is not in the anomalous state, it indicates that there is not any foreign matter on the surface of the service battery. In this case, the surface image does not need to be uploaded to the server, thereby reducing the number of images stored in the server. When there is a battery fault, a stored image of a faulty battery can be quickly found. This further improves user experience. Because the service battery is not in the anomalous state, it indicates that the service battery is normal, and it is only required to mount the service battery onto the electric vehicle with a battery to be swapped.

As shown in FIG. 10, in step S021, the step of invoking the second preset model for analyzing the surface image specifically includes:

S0211, obtaining second pixels of the surface image;

S0212, determining whether the second pixels are greater than second preset pixels; and if the second pixels are not greater than the second preset pixels, performing step S0213; or if the second pixels are greater than the second preset pixels, performing step S0214;

S0213, directly analyzing the surface image;

S0214, dividing the surface image into a plurality of second sub-images according to a second preset method, and obtaining a position of each of the second sub-images in the surface image; and S0215, analyzing each of the second sub-images.

In step S0213, if the second pixels are less than or equal to the second preset pixels, where for example, the second preset pixels are 15 million pixels, and the second pixels obtained in step S0211 are 10 million pixels, which are less than the second preset pixels, it indicates that the surface image is relatively small, such that an analysis result can be quickly obtained, because the surface image can be directly analyzed without a need to divide the surface image.

In steps S0214 and S0215, if the second pixels are greater than the second preset pixels, where for example, the second preset pixels are 15 million pixels, and the second pixels obtained in step S0211 are 20 million pixels, which are greater than the second preset pixels, it indicates that the surface image is relatively large, such that an analysis speed is relatively slow, and it takes a relatively long time to obtain an analysis result. To speed up the analysis, the surface image is divided into the plurality of second sub-images according to the second preset method, and the position of each of the second sub-images in the surface image is obtained. Each of the second sub-images is analyzed, and an analysis result of each of the second sub-images is marked in the service battery image based on a position corresponding to the second sub-image, thereby obtaining the analysis result of the surface image. Certainly, in a process of analyzing the image, there are some requirements on hardware for the analysis. To be specific, when image pixels are excessively high (for example, 20 million pixels), hardware with a high computing capacity is required for the analysis.

The second preset method may be that the surface image is divided into N parts, for example, 4, 7, 10, or 15 parts, based on a size of the surface image, where N is a positive integer. Each part of image is captured, and the captured image is used as a second sub-image. Alternatively, the second preset method may be that different slider boxes are provided, and an image in each slider box is captured, and the captured image is used as a second sub-image. Certainly, the second preset method is not limited to the method listed above. Any method can be used provided that the surface image can be divided into a plurality of second sub-images. In addition, the second preset method and the first preset method may be the same, or may be different.

It should be noted that, the second pixels and the second preset pixels listed above are only exemplary but not limiting. Those skilled in the art may determine the second pixels and the second preset pixels based on actual detection results and preset model processing speeds in actual application. In addition, although the second preset pixels and the first preset pixels are the same, in actual application, the second preset pixels and the first preset pixels may be set to be different. This is not limited in the invention.

It should also be noted that in the foregoing process, there is no sequential order between steps S023 and S024 that are parallel. The order is only related to the determination result of whether there is a foreign matter on the surface of the service battery. Steps only need to be performed correspondingly based on different determination results. There is no sequential order between steps S031 and S032 that are parallel. The order is only related to the determination result of whether the service battery is in the anomalous state. Steps only need to be performed correspondingly based on different determination results. There is no sequential order between steps S0213 and S0214 that are parallel. The order is only related to the determination result of whether the second pixels are greater than the second preset pixels. Steps only need to be performed correspondingly based on different determination results.

Figure 15:
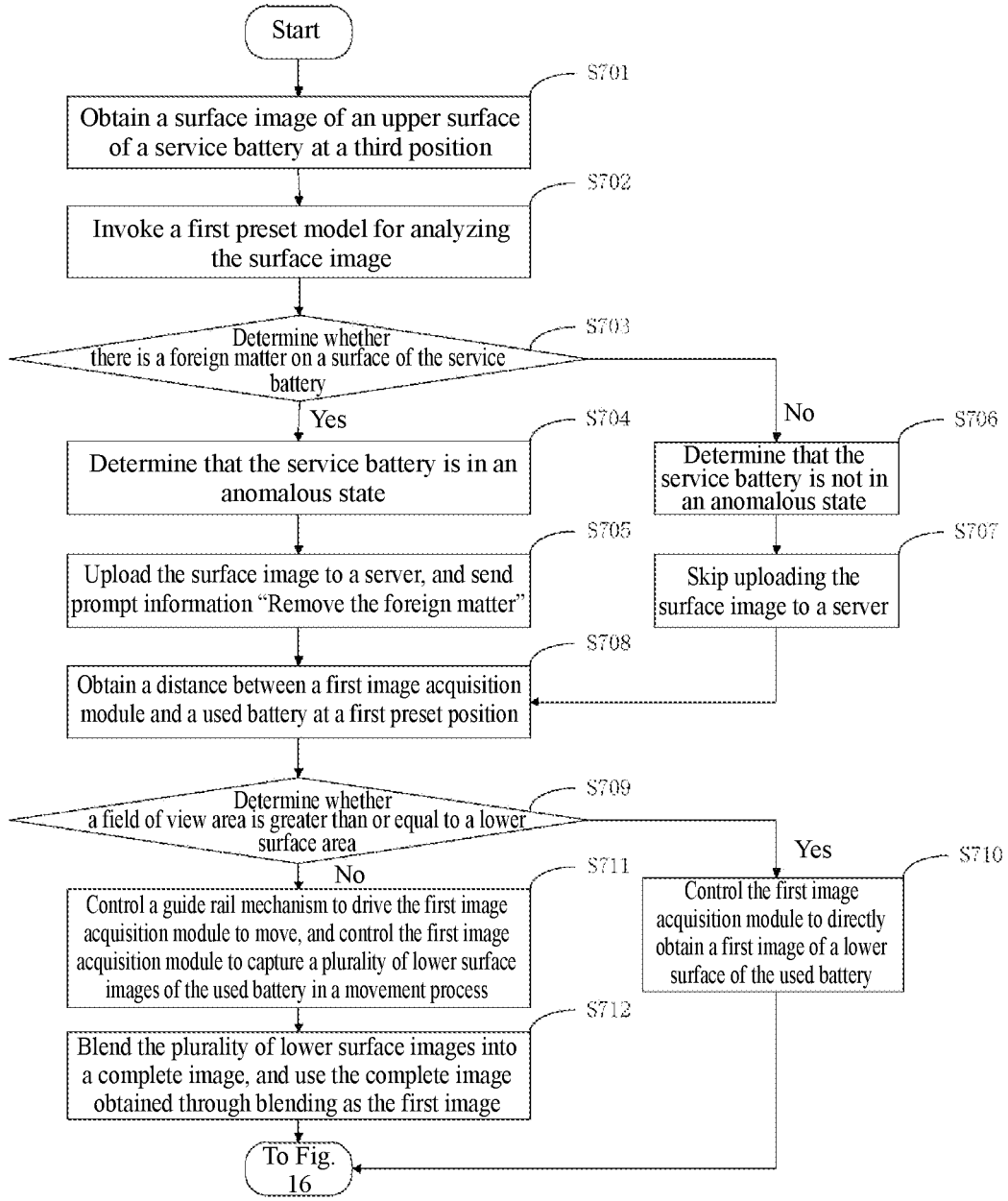
FIG. 15 is a logic diagram 1 of a detection method for battery swap according to the invention.
Figure 16:
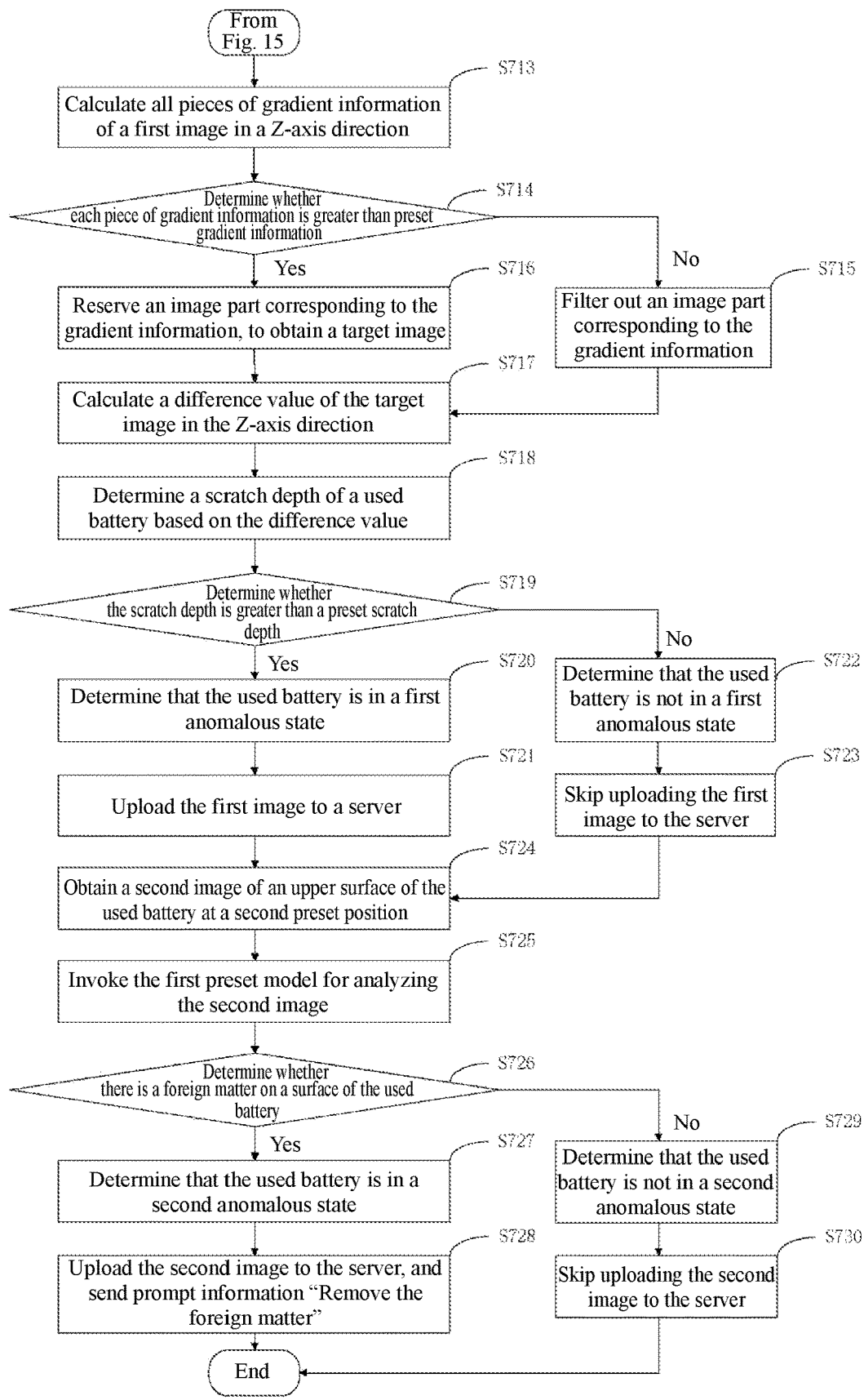
FIG. 16 is a logic diagram 2 of a detection method for battery swap according to the invention.

A possible procedure of detection in the invention is described with reference to FIGS. 15 and 16 below and by using an example in which the first preset model and the second preset model is the same model and the first preset model is used as an analysis model. FIG. 15 is a logic diagram 1 of a detection method for battery swap according to the invention. FIG. 16 is a logic diagram 2 of a detection method for battery swap according to the invention. As shown in FIGS. 15 and 16, a possible complete procedure of a detection method for battery swap according to the invention is:

S701, obtaining a surface image of an upper surface of a service battery when the service battery is conveyed from a battery compartment to a third preset position before battery swap of an electric vehicle with a battery to be swapped;

S702, invoking a first preset model for analyzing the surface image;

S703, determining, based on an analysis result, whether there is a foreign matter on a surface of the service battery; and if there is a foreign matter on the surface of the service battery, performing step S704; or if there is no foreign matter on the surface of the service battery, performing step S706;

S704, determining that the service battery is in an anomalous state;

S705, uploading the surface image to a server, and sending prompt information "Remove the foreign matter";

S706, determining that the service battery is not in the anomalous state;

S707, skipping uploading the surface image to the server;

S708, obtaining a distance between a first image acquisition module and a used battery at a first preset position after the electric vehicle with a battery to be swapped arrives at a battery swap platform;

S709, determining, based on the distance, whether a field of view area of the first image acquisition module is greater than or equal to a lower surface area of the used battery; and if the field of view area of the first image acquisition module is greater than or equal to the lower surface area of the used battery, performing step S710; or if the field of view area of the first image acquisition module is less than the lower surface area of the used battery, performing step S711;

S710, controlling the first image acquisition module to directly obtain a first image of a lower surface of the used battery;

S711, controlling a guide rail mechanism to drive the first image acquisition module to move, and controlling the first image acquisition module to capture a plurality of lower surface images of the used battery in a movement process;

S712, blending the plurality of lower surface images into a complete image, and using the complete image obtained through blending as the first image, where step S713 is performed after step S710 or step S712;

S713, calculating all pieces of gradient information of the first image in a Z-axis direction;

S714, determining whether each piece of gradient information is greater than preset gradient information; and if each piece of gradient information is not greater than the preset gradient information, performing step S715; or if each piece of gradient information is greater than preset gradient information, performing step S716;

S715, filtering out an image part corresponding to the gradient information; or

S716, reserving an image part corresponding to the gradient information, to obtain a target image;

S717, calculating a difference value of the target image in the Z-axis direction;

S718, determining a scratch depth of the used battery based on the difference value;

S719, determining whether the scratch depth is greater than a preset scratch depth; and if the scratch depth is greater than the preset scratch depth, performing step S720; or if the scratch depth is not greater than the preset scratch depth, performing step S721;

S720, determining that the used battery is in a first anomalous state; and

S721, uploading the first image to the server; or

S722, determining that the used battery is not in the first anomalous state; and S723, skipping uploading the first image to the server, where step S724 is performed when the used battery is detached and conveyed to a second preset position;

S724, obtaining a second image of an upper surface of the used battery;

S725, invoking the first preset model for analyzing the second image;

S726, determining, based on an analysis result, whether there is a foreign matter on a surface of the used battery; and if there is a foreign matter on the surface of the used battery, performing step S727; or if there is no foreign matter on the surface of the used battery, performing step S729;

S727, determining that the used battery is in a second anomalous state; and

S728, uploading the second image to the server, and sending prompt information "Remove the foreign matter"; or S729, determining that the used battery is not in the second anomalous state; and S730, skipping uploading the second image to the server.

It should be noted that the foregoing embodiments are merely preferred embodiments of the invention, and are merely used to explain the principle of the method in the invention, but are not intended to limit the scope of protection of the invention. In actual application, those skilled in the art may implement the foregoing functions by allocating them to different steps based on requirements, that is, further divide or combine the steps in the embodiments of the invention. For example, the steps in the foregoing embodiments may be combined into one step, or may be further divided into a plurality of sub-steps, to implement all or some functions described above. Names of the steps used in the embodiments of the invention are merely for distinguishing various steps, but are not considered a limitation on the invention.

Heretofore, the technical solutions of the invention have been described in conjunction with the preferred embodiments shown in the drawings, however, those skilled in the art can readily understand that the scope of protection of the invention is obviously not limited to these specific embodiments. Those skilled in the art could make equivalent changes or substitutions to the related technical features without departing from the principles of the invention, and all the technical solutions after the changes or the substitutions fall within the scope of protection of the invention.

The invention claimed is:

1. A detection method for battery swap in a battery swap station, wherein the battery swap station comprises a battery swap platform, a first image acquisition module mounted in the battery swap platform, a conveying mechanism, a second image acquisition module, and a battery compartment; and the detection method for battery swap comprises the following steps:
obtaining a first image of a used battery by using the first image acquisition module after a vehicle with a battery to be swapped arrives at a first preset position;
determining, based on the first image, whether the used battery is in a first anomalous state, wherein the first anomalous state include a scratched state or dented state;
uploading the first image to the server if the used battery is in the first anomalous state;
obtaining a second image of the used battery by using the second image acquisition module when the used battery is detached and conveyed to a second preset position through the conveying mechanism;
determining, based on the second image, whether the used battery is in a second anomalous state by invoking a first preset model, wherein the second anomalous state is a state in which there is a foreign matter on a surface of the used battery; and
uploading the second image to the server if the used battery is in the second anomalous state,
wherein the first preset position is in the battery swap platform; and
the second preset position is in the battery compartment;
wherein the step of determining, based on the first image, whether the used battery is in a first anomalous state specifically comprises:
pre-processing the first image to obtain a target image; and
determining, based on the target image, whether the used battery is in the first anomalous state;
wherein the first image is a three-dimensional image; and the step of pre-processing the first image to obtain a target image specifically comprises:
calculating all pieces of gradient information of the first image in a Z-axis direction;
determining whether each piece of gradient information is greater than preset gradient information;
if the gradient information is greater than the preset gradient information, reserving an image part corresponding to the gradient information, to obtain the target image; and/or
if the gradient information is less than or equal to the preset gradient information, filtering out an image part corresponding to the gradient information.

2. The detection method for battery swap according to claim 1, wherein the step of determining, based on the target image, whether the used battery is in the first anomalous state specifically comprises:
calculating a difference value of the target image in the Z-axis direction;
determining a scratch depth or a dent depth of the used battery based on the difference value;
determining whether the scratch depth or the dent depth is greater than a preset depth;
if the scratch depth is greater than the preset depth, determining that the used battery is in the first anomalous state; and/or
if the scratch depth is less than or equal to the preset depth, determining that the used battery is not in the first anomalous state.

3. The detection method for battery swap according to claim 2, wherein the method further comprises:
if the used battery is not in the first anomalous state, skipping uploading the first image to the server.

4. The detection method for battery swap according to claim 1,
wherein the used battery is mounted at the bottom of the vehicle with a battery to be swapped; and the first image is an image of a lower surface of the used battery.

5. The detection method for battery swap according to claim 4, wherein the step of obtaining the first image by using the first image acquisition module specifically comprises:
- obtaining a distance between the first image acquisition module and the used battery;
- determining, based on the distance, whether a field of view area of the first image acquisition module is greater than or equal to a lower surface area of the used battery; and
- selectively controlling, based on a determination result, the first image acquisition module to directly obtain the first image.

6. The detection method for battery swap according to claim 5, wherein the battery swap station further comprises a guide rail mechanism, and the first image acquisition module is mounted on the guide rail mechanism; and
- the step of selectively controlling, based on a determination result, the first image acquisition module to directly obtain the first image specifically comprises:
- if the field of view area is greater than or equal to the lower surface area, controlling the first image acquisition module to directly obtain the first image; and/or
- if the field of view area is less than the lower surface area, controlling the guide rail mechanism to drive the first image acquisition module to move, and controlling the first image acquisition module to capture a plurality of lower surface images of the used battery in a movement process, and
- blending the plurality of lower surface images into a complete image, and using the complete image obtained through blending as the first image.

7. The detection method for battery swap according to claim 1, wherein the step of determining, based on the second image, whether the used battery is in a second anomalous state comprises:
- invoking the first preset model for analyzing the second image;
- determining, based on an analysis result, whether there is a foreign matter on a surface of the used battery; and
- if there is a foreign matter on the surface of the used battery, determining that the used battery is in the second anomalous state; or
- if there is no foreign matter on the surface of the used battery, determining that the used battery is not in the second anomalous state.

8. The detection method for battery swap according to claim 1, wherein the method further comprises:
- if the used battery is in the second anomalous state, sending prompt information "Remove the foreign matter"; and/or
- if the used battery is not in the second anomalous state, skipping uploading the second image to the server.

9. The detection method for battery swap according to claim 7, wherein the step of invoking the first preset model for analyzing the second image comprises:
- determining whether first pixels of the second image are greater than first preset pixels; and
- if the first pixels are greater than the first preset pixels, dividing the second image into a plurality of first sub-images according to a first preset method, and obtaining a position of each of the first sub-images in the surface image, and
- analyzing each of the first sub-images; and/or
- if the first pixels are less than or equal to the first preset pixels, directly analyzing the second image.

10. The detection method for battery swap according to claim 1, wherein the detection method for battery swap further comprises:
- obtaining a surface image of a service battery at a third preset position before battery swap of a vehicle with a battery to be swapped;
- determining, based on the surface image, whether the service battery is in an anomalous state, wherein the anomalous state is a state in which there is a foreign matter on a surface of the service battery; and
- uploading the surface image to the server if the service battery is in the anomalous state,
- wherein the third preset position is in the battery compartment.

11. The detection method for battery swap according to claim 10, wherein the step of determining, based on the surface image, whether the service battery is in an anomalous state comprises:
- invoking a second preset model for analyzing the surface image;
- determining, based on an analysis result, whether there is a foreign matter on a surface of the service battery; and
- if there is a foreign matter on the surface of the service battery, determining that the service battery is in the anomalous state; or
- if there is no foreign matter on the surface of the service battery, determining that the service battery is not in the anomalous state.

12. The detection method for battery swap according to claim 11, wherein the method further comprises:
- if the service battery is in the anomalous state, sending prompt information "Remove the foreign matter"; and/or
- if the service battery is not in the anomalous state, skipping uploading the surface image to the server.

13. The detection method for battery swap according to claim 11, wherein the step of invoking a second preset model for analyzing the surface image comprises:
- determining whether second pixels of the surface image are greater than second preset pixels; and
- if the second pixels are greater than the second preset pixels, dividing the surface image into a plurality of second sub-images according to a second preset method, and obtaining a position of each of the second sub-images in the surface image, and
- analyzing each of the second sub-images; and/or
- if the second pixels are less than or equal to the second preset pixels, directly analyzing the surface image.

* * * * *